（12） United States Patent
Shimamoto et al.

(10) Patent No.: US 9,083,880 B2
(45) Date of Patent: Jul. 14, 2015

(54) IMAGING DEVICE, SEMICONDUCTOR INTEGRATED CIRCUIT, AND IMAGING METHOD

(75) Inventors: Takeshi Shimamoto, Osaka (JP); Yoshiaki Sugitani, Nara (JP); Takashi Kawamura, Kyoto (JP)

(73) Assignee: Panasonic Corporation, Osaka (JP)

( * ) Notice: Subject to any disclaimer, the term of this patent is extended or adjusted under 35 U.S.C. 154(b) by 23 days.

(21) Appl. No.: 13/983,381

(22) PCT Filed: Mar. 1, 2012

(86) PCT No.: PCT/JP2012/001411
§ 371 (c)(1),
(2), (4) Date: Aug. 2, 2013

(87) PCT Pub. No.: WO2012/117733
PCT Pub. Date: Sep. 7, 2012

(65) Prior Publication Data
US 2013/0314586 A1 Nov. 28, 2013

(30) Foreign Application Priority Data
Mar. 2, 2011 (JP) ................................ 2011-044634

(51) Int. Cl.
*G03B 13/00* (2006.01)
*H04N 5/232* (2006.01)
(Continued)

(52) U.S. Cl.
CPC .............. *H04N 5/23212* (2013.01); *G02B 7/38* (2013.01); *H04N 5/2353* (2013.01)

(58) Field of Classification Search
CPC ................................................ H04N 5/23212
USPC ......................................................... 348/348
See application file for complete search history.

(56) References Cited

U.S. PATENT DOCUMENTS 5,148,502 A 9/1992 Tsujiuchi et al.
5,917,657 A 6/1999 Kaneko et al.
(Continued)

FOREIGN PATENT DOCUMENTS

CN 1716083 A 1/2006
DE 23 01 800 B2 10/1974
(Continued)

OTHER PUBLICATIONS

Supplementary European Search Report for corresponding European Application No. EP 12 75 2314 dated Oct. 7, 2014.
(Continued)

*Primary Examiner* — Christopher K Peterson
(74) *Attorney, Agent, or Firm* — Renner, Otto, Boisselle & Sklar, LLP

(57) ABSTRACT

An image-capturing device disclosed in the present application includes: an image-capturing element including a plurality of photoelectric conversion elements arranged in two dimensions, wherein the plurality of photoelectric conversion elements are exposed through successive scanning and electrical signals are read out from the plurality of photoelectric conversion elements through successive scanning, thereby generating an image signal; a lens optical system including a focus lens for collecting light toward the image-capturing element; a driving section for driving one of the image-capturing element and the focus lens so as to change a distance between the image-capturing element and the focus lens; a displacement control section for outputting a command to the driving section so as to control displacement of the image-capturing element or the focus lens to be driven based on a predetermined displacement pattern; and a synchronizing section for controlling the displacement control section based on exposure timing of the image-capturing element, wherein: the predetermined displacement pattern represents a reciprocal displacement of the image-capturing element or the focus lens to be driven over an entire section between a first focus position of the focus lens or the image-capturing element at which focus is at a first object distance in an image-capturing scene and a second focus position of the focus lens or the image-capturing element at which focus is at a second object distance in the image-capturing scene; and the image-capturing element or the focus lens to be driven is reciprocally displaced an integer number of times within an exposure time for one image of the image-capturing scene for each of the plurality of photoelectric conversion elements.

9 Claims, 14 Drawing Sheets

(51) Int. Cl.
*G02B 7/38* (2006.01)
*H04N 5/235* (2006.01)

(56) References Cited

U.S. PATENT DOCUMENTS

| | | |
|---|---|---|
| 6,344,930 B1 | 2/2002 | Kaneko et al. |
| 6,774,944 B1 | 8/2004 | Fukuyama |
| 7,711,259 B2 | 5/2010 | Daley |
| 2006/0001763 A1 | 1/2006 | Takemoto |
| 2006/0291844 A1 | 12/2006 | Kakkori |
| 2006/0291884 A1 | 12/2006 | Okamoto et al. |
| 2008/0292298 A1 | 11/2008 | Hirai |
| 2011/0292364 A1* | 12/2011 | Kawamura .................. 355/55 |

FOREIGN PATENT DOCUMENTS

| | | |
|---|---|---|
| JP | 60-068312 A | 4/1985 |
| JP | 01-309478 A | 12/1989 |
| JP | 04-308975 A | 10/1992 |
| JP | 05-027084 B | 4/1993 |
| JP | 05-313068 A | 11/1993 |
| JP | 09-230252 A | 9/1997 |
| JP | 10-257373 A | 9/1998 |
| JP | 2000-152063 A | 5/2000 |
| JP | 3084130 B | 6/2000 |
| JP | 2000-316120 A | 11/2000 |
| JP | 3191928 B | 5/2001 |
| JP | 2001-257932 A | 9/2001 |
| JP | 2003-319239 A | 11/2003 |
| JP | 2006-047954 A | 2/2006 |
| JP | 2007-010908 A | 1/2007 |
| JP | 2009-206831 A | 9/2009 |
| WO | WO/2011/070757 * | 6/2011 ............... G02B 7/28 |

OTHER PUBLICATIONS

Kuthirummal et al., "Flexible Depth of Field Photography"; IEEE Transactions on Pattern Analysis and Machine Intelligence, IEEE Computer Society USA, vol. 33, No. 1, Jan. 31, 2011, pp. 58-71, XP011373495.

International Search Report for corresponding International Application No. PCT/JP2012/001411 mailed Apr. 17, 2012.

Preliminary Report on Patentability for corresponding International Application No. PCT/JP2012/001411 dated Mar. 19, 2013.

E. R. Dowski and W. T. Cathey, "Extended depth of field through wave-front coding", Applied Optics, vol. 34, No. 11, p. 1859-1866 (1995).

A. Levin, R. Fergus, F. Durand and W. T. Freeman, "Image and Depth from a Conventional Camera with a Coded Aperture", ACM Transactions on Graphics, vol. 26, No. 3, Article 70, 70-1-70-9 (2007).

H. Nagahara, S. Kuthirummal, C. Zhou and S. Nayar, "Flexible Depth of Field Photography", European Conference on Computer Vision (ECCV), Oct. 16th, Morning Session 2: Computational Photography (2008).

C. Tisse, H. P. Nguyen, R. Tesieres, M. Pyanet and F. Guichard, "Extended Depth-of-field (EDOF) using sharpness transport across colour channels", Optical Engineering + Applications, Part of SPIE Optics + Photonics, Session 1—Imaging in the Optical Design Process: Depth of Field (2008).

W. Chi and N. George, "Computational imaging with the logarithmic asphere: theory", Optical Society of America, vol. 20, No. 12, Dec. (2003).

Y. Takahashi and S. Komatsu, "Optimized free-form phase mask for extension of depth of field in wavefront-coded imaging", Optical Society of America, Optics Letters, vol. 33, No. 13, Jul. 1, (2008).

Yasuhisa Takahashi, Ryo Obana and Shinichi Komatsu: "Optimized phase mask for wave-front coding: Extended DOF in off axis field", Optics & Photonics Japan 2007 (The Optical Society of Japan, Annual Scientific Conference), Proceedings, p. 464-465 (27pC2), (2007) with English Abstract.

Chinese Search Report dated May 5, 2015 for corresponding Chinese Application No. 201280007501.1 and English translation.

* cited by examiner

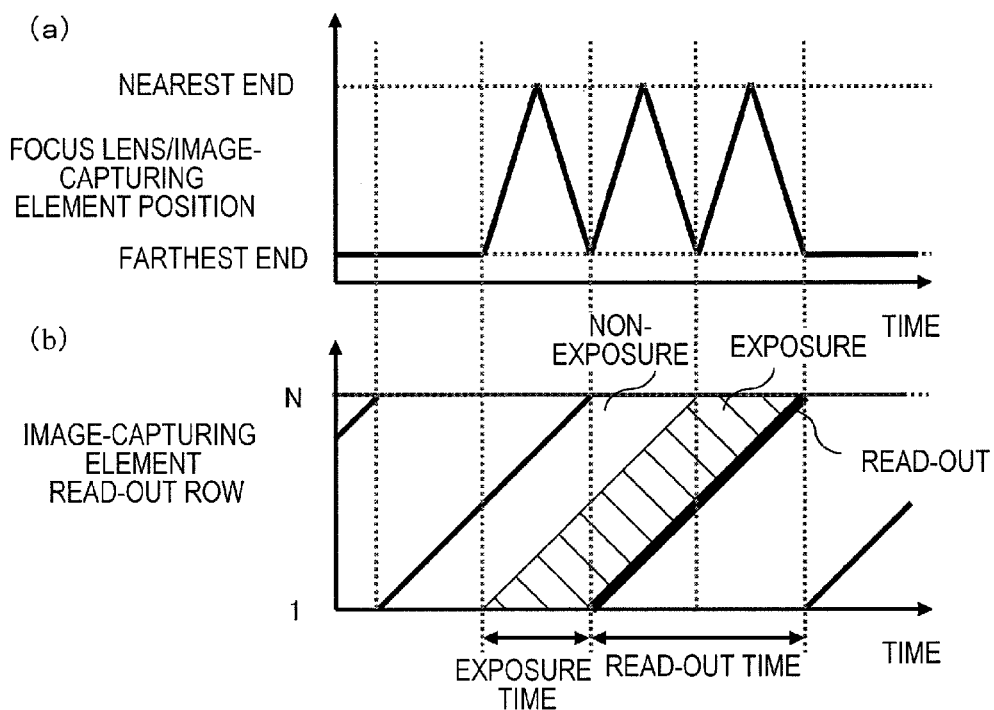
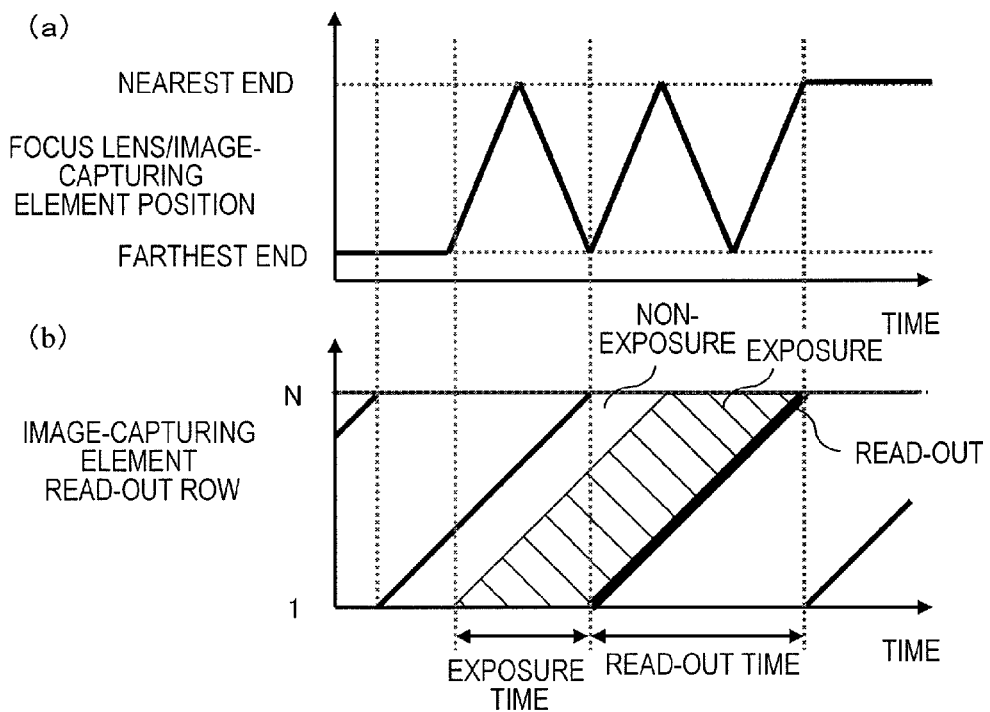

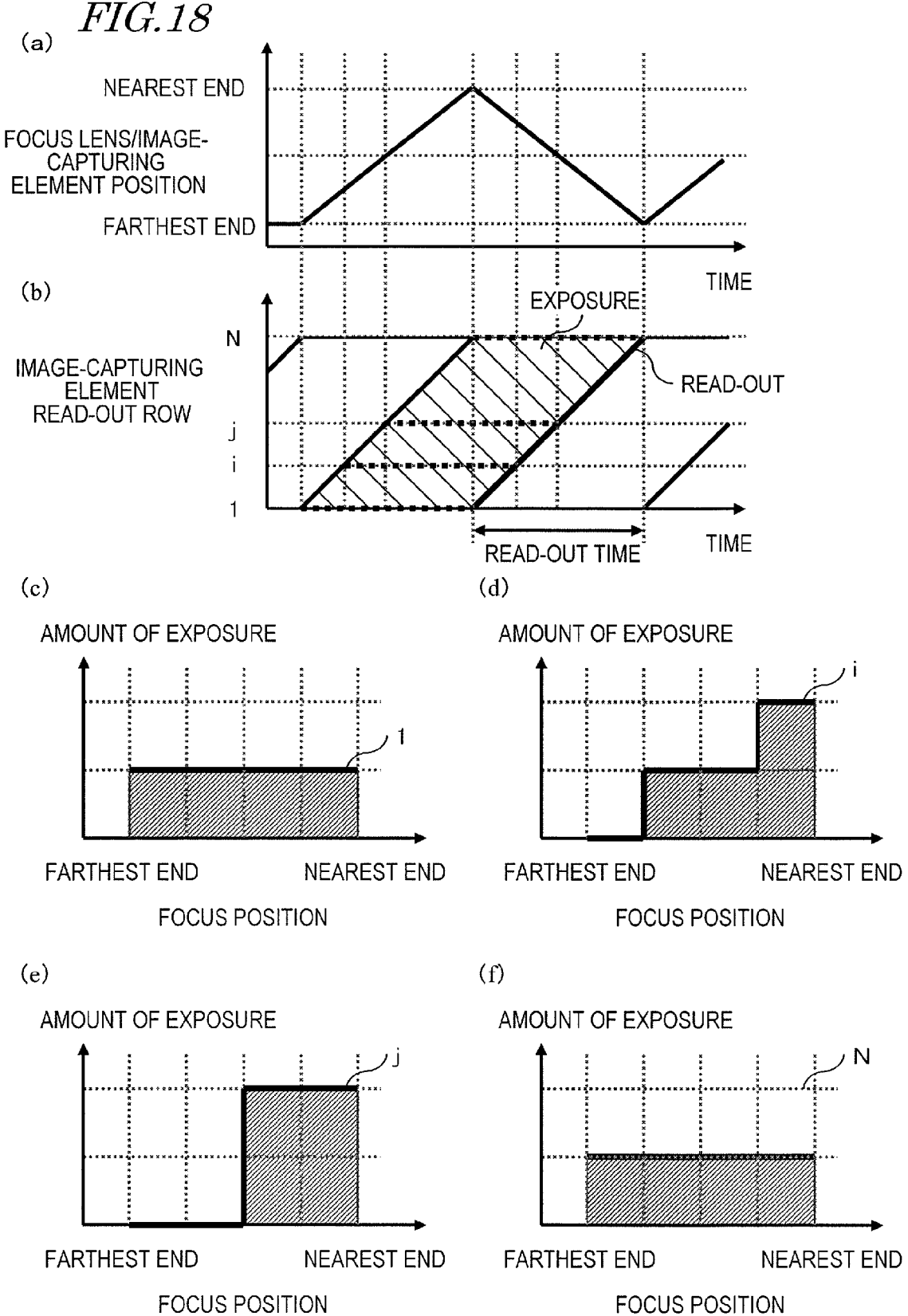

IMAGING DEVICE, SEMICONDUCTOR INTEGRATED CIRCUIT, AND IMAGING METHOD

TECHNICAL FIELD

The present invention relates to capturing a video or a series of still images by the Flexible DOF (Depth Of Field) scheme used in extended depth of field, for example.

BACKGROUND ART

Typically, there are primarily three schemes as described below for realizing Extended Depth Of Field (hereinafter referred to as "EDOF") in image-capturing devices.

The first scheme is a scheme in which an optical element, called a phase plate, is inserted, whereby the blur of the image is made uniform in the depth direction, and an image restoration process using a blur pattern obtained in advance through a measurement or simulation is performed, thus obtaining an image with an extended depth of field (hereinafter referred to as an "EDOF image"). This scheme is referred to as Wavefront Coding (hereinafter referred to as "WFC") (Non-Patent Document No. 1).

The second scheme is a scheme in which a high-precision distance measurement is performed on each partial areas of an image by devising the diaphragm shape, and an image restoration process is performed by using a blur pattern obtained based on the distance of each partial area that has been measured in advance, thus obtaining an EDOF image. This scheme is referred to as Coded Aperture (hereinafter referred to as "CA") (Non-Patent Document No. 2).

The third scheme is a scheme of moving the focus lens or the image-capturing element during the exposure time, convoluting an image that is uniformly focused in the depth direction (which is equivalent to making the blur uniform across different depths), and performing an image restoration process using a blur pattern obtained in advance through a measurement or simulation, thereby obtaining an EDOF image. This scheme is referred to as Flexible DOF (hereinafter referred to as "F-DOF") (Non-Patent Document No. 3).

Another scheme known in the art is a scheme in which depth estimation or image sharpness detection is performed by utilizing the axial chromatic aberration of the lens, thereby obtaining an image that is sharp as a whole through image processes (Non-Patent Document No. 4). Also known in the art is a scheme in which the blur of an image is made uniform in the depth direction using a multi-focus lens, and an image restoration process is performed by using a blur pattern obtained in advance through a measurement or simulation (Non-Patent Document No. 5). However, these schemes, in principle, give a limited level of EDOF effects as compared with the three schemes described earlier.

Moreover, a scheme called "Focal Stack" has long been known in the art. In this scheme, a plurality of images of different focus positions are captured, and different areas believed to be in focus are extracted from the images and synthesized together, obtaining an EDOF image. This scheme requires many captured images, thereby requiring relatively a long time for capturing the images and consuming a large amount of memory space for storing the images.

With WFC, of the three schemes described above, various types of phase plates have been proposed, including Cubic Phase Mask (hereinafter referred to as "CPM"), Free-Form Phase Mask (hereinafter referred to as "FPM"), and the like, as those that give the highest level of EDOF effects. It is believed that FPM is prosperous in view of the image quality after restoration (how small the amount of artifacts is) (Non-Patent Document No. 6). However, a drawback common to all WFC schemes is that off-axis properties of the lens deteriorate by the insertion of a phase plate (Non-Patent Document No. 7). Specifically, since the same level of blur uniformizing effect cannot be realized for incident light coming from directions other than from the front direction, as compared with incident light from the front direction, the off-axis image quality after restoration deteriorate if the restoration process is performed using an axial blur pattern in the image restoration.

With CA, of the three schemes described above, due to the characteristic of the scheme itself that the distance measurement precision is enhanced by inserting a diaphragm of a characteristic shape, particular frequency components of a captured image or an image obtained following a restoration process are lost, i.e., the image quality deteriorates. Moreover, the amount of light is typically reduced from that of an ordinary image-capturing method, irrespective of the diaphragm shape, and it is therefore not suitable for capturing an image in dark places.

F-DOF, of the three schemes described above, is the scheme capable of producing the best image quality, and also gives a high level of EDOF effects. Since the off-axis characteristics are also dependent on the lens characteristics themselves, it is possible to easily enhance the performance. Note however that with F-DOF, an image of a good image quality is obtained when the same object is convoluted onto the same image position even if the position of the focus lens is moved during exposure. Therefore, an image-side telecentric lens may be used in some cases with F-DOF.

One field in which the EDOF technique is applied is microscopy. When capturing an image with a microscope, the object to be captured is a stationary object, and therefore it is possible to use some time to capture an image. Therefore, the focal stack scheme has long been used. Note however that since this scheme requires labor and time as described above, techniques have been proposed in which the F-DOF scheme is also used in combination (Patent Document Nos. 1 to 4). Where F-DOF is used in a microscope application, the sample, which is the object, or the lens barrel is moved during the exposure. Where it is assumed that a post-exposure image restoration process is performed, the object or the lens barrel is moved so that the blur of the image is always uniform. It has been known that appropriately controlling this manner of movement is practical because it is then possible to use an image restoration process method using a single blur pattern (Patent Document No. 5). For this purpose, when the image-capturing element is moved, the image-capturing element is moved at a uniform velocity. Where the focus lens is moved, it is necessary to realize focus displacement that is equivalent to the image-capturing surface moving at a uniform velocity (Non-Patent Document No. 3). It is known that the pattern of movement may be from the far-side focus end position to the near-side focus end position, or the opposite thereto.

In addition, examples have been known in recent years where the EDOF techniques are applied to cameras provided in mobile telephones, or the like. This is because due to the EDOF effects, an all-in-focus image (an image where all the objects are in focus) can be obtained without having an autofocus mechanism. In this regard, of the three schemes described above, WFC and schemes using the axial chromatic aberration have been employed. F-DOF is not commonly employed because it requires a mechanism for moving the focus lens or the image-capturing element.

CITATION LIST

Patent Literature

Patent Document No. 1: German Patent No. 2301800 B2
Patent Document No. 2: Japanese Patent Publication for Opposition No. 5-27084
Patent Document No. 3: Japanese Patent No. 3191928
Patent Document No. 4: U.S. Pat. No. 7,711,259
Patent Document No. 5: Japanese Patent No. 3084130
Patent Document No. 6: Japanese Laid-Open Patent Publication No. 2006-47954
Patent Document No. 7: Japanese Laid-Open Patent Publication No. 2007-10908

Non-Patent Literature

Non-Patent Document No. 1: E. R. Dowski and W. T. Cathey, "Extended depth of field through wave-front coding", Applied Optics, Vol. 34, No. 11, P. 1859-1866 (1995)
Non-Patent Document No. 2: A. Levin, R. Fergus, F. Durand and W. T. Freeman, "Image and Depth from a Conventional Camera with a Coded Aperture", ACM Transactions on Graphics, Vol. 26, No. 3, Article 70, 70-1-70-9 (2007)
Non-Patent Document No. 3: H. Nagahara, S. Kuthirummal, C. Zhou and S. Nayar, "Flexible Depth of Field Photography", European Conference on Computer Vision (ECCV), October 16th, Morning Session 2: Computational Photography (2008)
Non-Patent Document No. 4: C. Tisse, H. P. Nguyen, R. Tesieres, M. Pyanet and F. Guichard, "Extended Depth-of-field (EDOF) using sharpness transport across colour channels", Optical Engineering+Applications, Part of SPIE Optics+Photonics, Session 1—Imaging in the Optical Design Process: Depth of Field (2008)
Non-Patent Document No. 5: W. Chi and N. George, "Computational imaging with the logarithmic asphere: theory", Optical Society of America, Vol. 20, No. 12, December (2003)
Non-Patent Document No. 6: Y. Takahashi and S. Komatsu, "Optimized free-form phase mask for extension of depth of field in wavefront-coded imaging", Optical Society of America, Optics Letters, Vol. 33, No. 13, Jul. 1, (2008)
Non-Patent Document No. 7: Yasuhisa Takahashi, Ryo Obana and Shinichi Komatsu: "Optimized phase mask for wave-front coding: Extended DOF in off axis field", Optics & Photonics Japan 2007 (The Optical Society of Japan, Annual Scientific Conference), Proceedings, P. 464-465 (27pC2), (2007)

SUMMARY OF INVENTION

Technical Problem

In recent years, there are needs for digital still cameras and digital video cameras capable of capturing images simply with little chance of failure. In order to realize such a digital still camera or a digital video camera, one may consider employing EDOF techniques. This is because, with EDOF techniques, one can expect an all-in-focus image, i.e., the advantage of being free of miss focuses.

In view of such problems, it is an object of the present invention to provide an image-capturing device capable of obtaining an EDOF image, and an integrated circuit and an image-capturing method for use in such an image-capturing device.

Solution to Problem

An image-capturing device disclosed in the present application includes: an image-capturing element including a plurality of photoelectric conversion elements arranged in two dimensions, wherein the plurality of photoelectric conversion elements are exposed through successive scanning and electrical signals are read out from the plurality of photoelectric conversion elements through successive scanning, thereby generating an image signal; a lens optical system including a focus lens for collecting light toward the image-capturing element; a driving section for driving one of the image-capturing element and the focus lens so as to change a distance between the image-capturing element and the focus lens; a displacement control section for outputting a command to the driving section so as to control displacement of the image-capturing element or the focus lens to be driven based on a predetermined displacement pattern; and a synchronizing section for controlling the displacement control section based on exposure timing of the image-capturing element, wherein: the predetermined displacement pattern represents a reciprocal displacement of the image-capturing element or the focus lens to be driven over an entire section between a first focus position of the focus lens or the image-capturing element at which focus is at a first object distance in an image-capturing scene and a second focus position of the focus lens or the image-capturing element at which focus is at a second object distance in the image-capturing scene; and the image-capturing element or the focus lens to be driven is reciprocally displaced an integer number of times within an exposure time for one image of the image-capturing scene for each of the plurality of photoelectric conversion elements.

Advantageous Effects of Invention

With the image-capturing device, the integrated circuit and the image-capturing method disclosed in the present application, it is possible to capture a video or a series of still images in an F-DOF scheme using a CMOS-type image-capturing element that performs a rolling shutter operation.

BRIEF DESCRIPTION OF DRAWINGS

FIG. 6 (a) shows an example of a displacement pattern of a focus lens or an image-capturing element according to the first and second embodiments, and (b) shows the exposure and read-out timing of the image-capturing element.

FIG. 7 (a) shows an example of a displacement pattern of a focus lens or an image-capturing element according to the first and second embodiments, and (b) shows the exposure and read-out timing of the image-capturing element.

FIG. 18 (a) shows an example of a displacement pattern of a focus lens or an image-capturing element for an image-capturing device shown in FIG. 12 or 16, and (b) shows the exposure and read-out timing of the image-capturing element; (c) to (f) each show a relationship between the amount of exposure for a predetermined row of the image-capturing element and the position of the focus lens or the image-capturing element.

DESCRIPTION OF EMBODIMENTS

The present inventors made an in-depth research on the structure suitable for obtaining an EDOF image for a digital still camera or a digital video camera having a mechanism for driving a focus lens such as an auto-focus mechanism, for use in a normal image-capturing operation. For a camera for such an application, the F-DOF scheme is suitable because the obtained image has a high image quality; the level of EDOF effects is high; it is possible to change the EDOF range arbitrarily; it can be realized as an application of an ordinary auto-focus mechanism (no need to provide a special optical system); it is easy to switch between an EDOF image-capturing operation and a normal image-capturing operation; etc.

Figure 12:
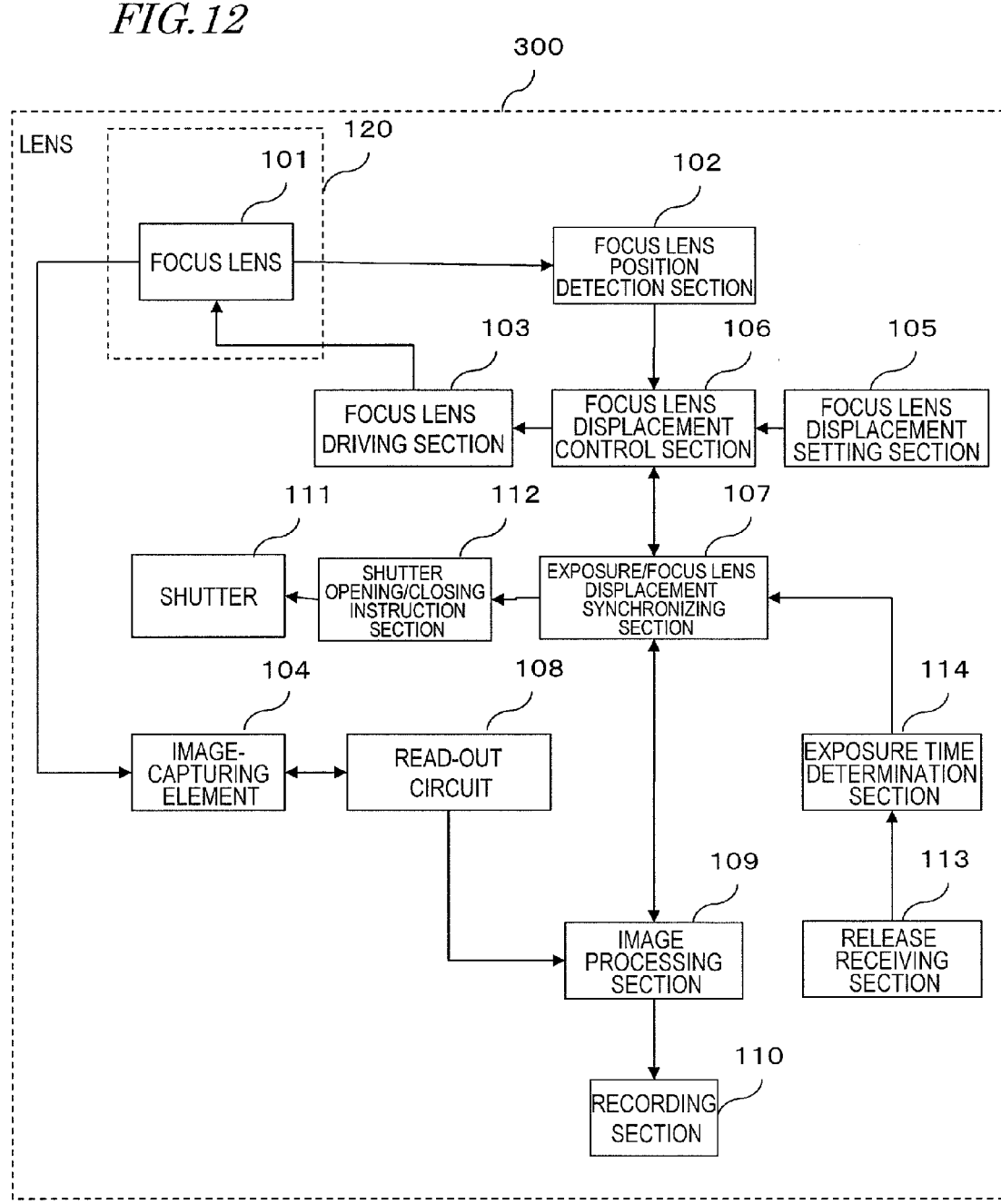
FIG. 12 A block configuration diagram of an image-capturing device examined by the present inventors.

First, a configuration necessary for realizing an image-capturing operation of the F-DOF scheme will be described with reference to FIGS. 12 and 13. The image-capturing device 300 shown in FIG. 12 shows an example of a structure for displacing the focus lens during the exposure time. The image-capturing device 300 includes a lens optical system 120 including a focus lens 101, a focus lens driving section 103 for driving the focus lens 101, and an image-capturing element 104. By changing the position of the focus lens 101, it is possible to change the distance from the image-capturing element 104 and to change the focus distance. Where it is considered that the focus lens 101 is fixed, changing the focus distance is equivalent to changing the focus position.

When a release receiving section 113 receives an exposure starting command from the user, a focus lens position detection section 102 detects the position of the focus lens 101 at that point in time (the initial position). After the detection, the position of the focus lens 101 is displaced to a predetermined end position, e.g., the nearest end or the farthest end.

Figure 13:
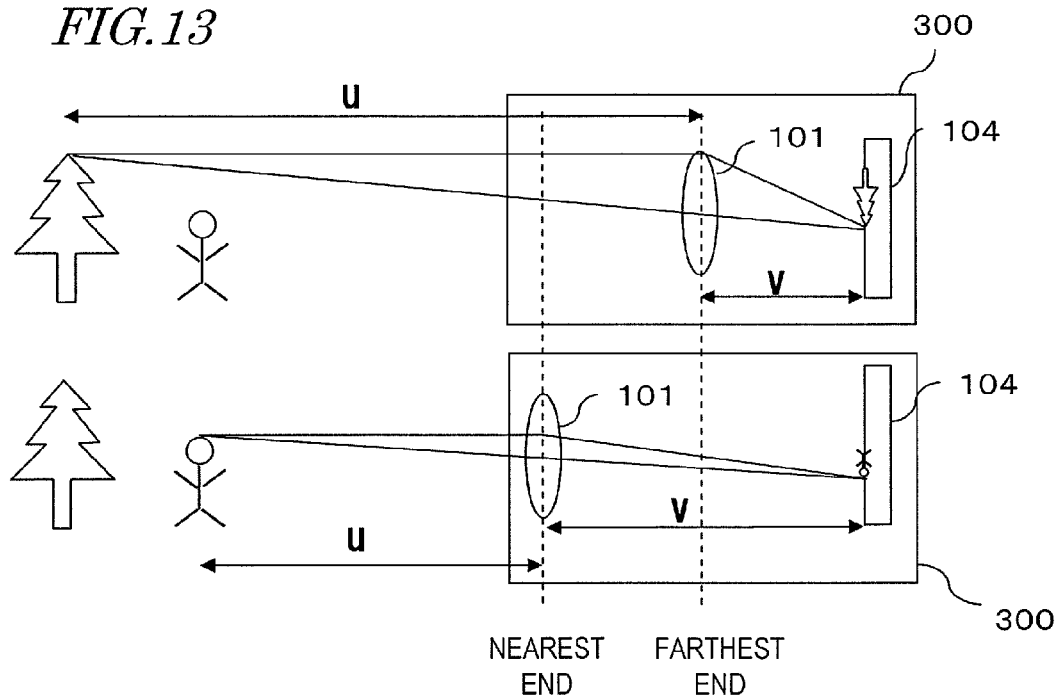
FIG. 13 A diagram showing a positional relationship between the object, the focus lens, and the image-capturing element.

FIG. 13 is a schematic diagram showing the positional relationship between the object included in the image-capturing scene, and the focus lens 101 and the image-capturing element 104 in the image-capturing device 300.

The nearest end refers to the position of the focus lens 101 when the focus lens 101 has been moved so that one of the objects included in the image-capturing scene that is closest to the image-capturing device 300 forms an image on the image-capturing surface of the image-capturing element 104. In this position, the distance u from the object to the focus lens 101 of the image-capturing device 300 is shortest, and the distance v between the focus lens 101 and the image-capturing element 104 is longest.

The farthest end refers to the position of the focus lens 101 when the focus lens 101 has moved so that one of the objects included in the image-capturing scene that is farthest away from the image-capturing device 300 forms an image on the image-capturing surface of the image-capturing element 104. In this position, the distance u from the object to the focus lens 101 of the image-capturing device 300 is longest, and the distance v between the focus lens 101 and image-capturing element is shortest. Note that in FIG. 13, for the purpose of illustration, the distance between the nearest end and the farthest end of the focus lens 101 is shown to be longer with respect to the distance between objects and the image-capturing device 300.

Figure 14:
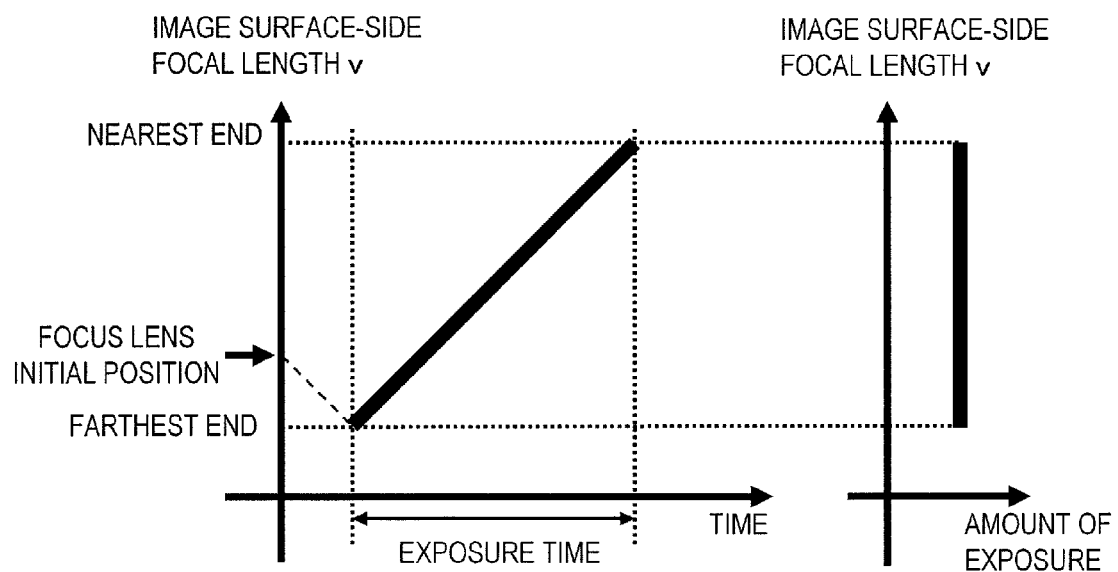
FIG. 14 A diagram showing a relationship between the position of the focus lens and the exposure time for the image-capturing device shown in FIG. 12.
Figure 15:
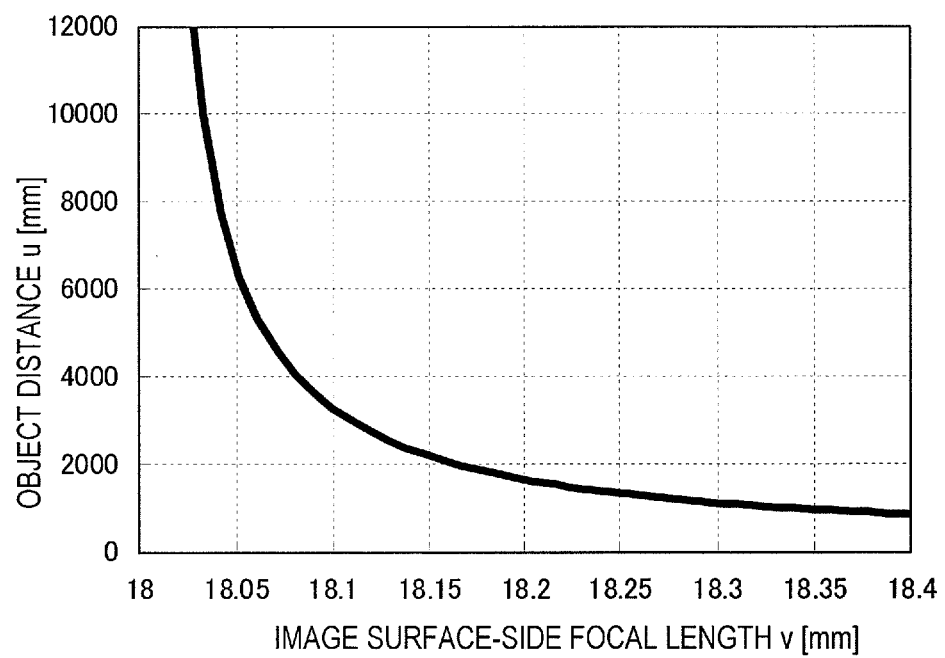
FIG. 15 A graph showing an example of a relationship between the object distance v and the image surface-side focal length u.

Simultaneously with the initialization of the focus lens 101, image-capturing parameters such as the shutter speed and the aperture are determined by an exposure time determination section 114. Immediately after the completion of these operations, an exposure/focus lens displacement synchronizing section 107 for synchronizing the exposure and the focus displacement outputs an exposure starting command to a focus lens displacement control section 106 and a shutter opening/closing instruction section 112. Simultaneously, based on the end position of the focus lens 101 detected by the focus lens position detection section 102, a command is output to the focus lens displacement control section 106 for displacing the focus lens 101 within the exposure time from the farthest end to the nearest end if the end position is the farthest end, or from the nearest end to the farthest end if the end position is the nearest end. FIG. 14 shows a relationship between the exposure time and the amount of exposure and the image surface-side focal length. The image surface-side focal length varies depending on the position of the focus lens 101, and the focus lens 101 is driven by the focus lens driving section 103 based on a command from the focus lens displacement control section 106 so that the position of the focus lens is displaced at a uniform velocity with respect to the surface of the image-capturing element. As described above, where the distance between the object and the focus lens 101 is u, the distance between the focus lens 101 and the image-capturing element 104 is v, and the focal length is f, the following relationship:

$$1/f = 1/u + 1/v \qquad \text{(Expression 1)}$$

holds true. Where there are a plurality of lenses, they are considered at the position of the lens principal point. As an example, a relationship between u and v where f is 18 [mm] is shown in FIG. 15. As the focus lens 101 is displaced, the distance v between the lens principal point and the image-capturing element changes. Driving the focus lens 101 so that the displacement of the focus lens changes at a uniform velocity with respect to the surface of the image-capturing element means that the speed of change of v is constant. As shown in FIG. 15, even though v is displaced at a uniform velocity, it does not mean that the distance u between the object-side focal plane and the lens principal point is displaced at a uniform velocity. Since the horizontal axis of FIG. 15 is the image surface-side focal length v, it is in a reverse relationship with respect to the magnitude of the object distance u. That is, the image surface-side focal length v is shorter for objects whose object distance is longer (which are located farther away).

Immediately after receiving an exposure starting command from the exposure/focus lens displacement synchronizing section 107, the shutter opening/closing instruction section 112 performs a control to open a shutter 111. After passage of a predetermined exposure time, the exposure/focus lens displacement synchronizing section 107 outputs an exposure ending command to the shutter opening/closing instruction section 112. Immediately after receiving the exposure ending command, the shutter opening/closing instruction section 112 performs a control to close the shutter 111.

When an optical image of an object forms on the image-capturing element 104 through the procedure above, the formed optical image is converted to an electrical signal by the image-capturing element 104, and an image signal is output to an image processing section 109 via a read-out circuit 108. Simultaneously, the exposure/focus lens displacement synchronizing section 107 gives a notification to the image processing section 109 that the exposure has been ended and an image-capturing operation with focus displacement by F-DOF has been performed. The image processing section 109 receives the image signal, performs necessary signal processes thereon, and outputs it to a recording section 110.

Figure 16:
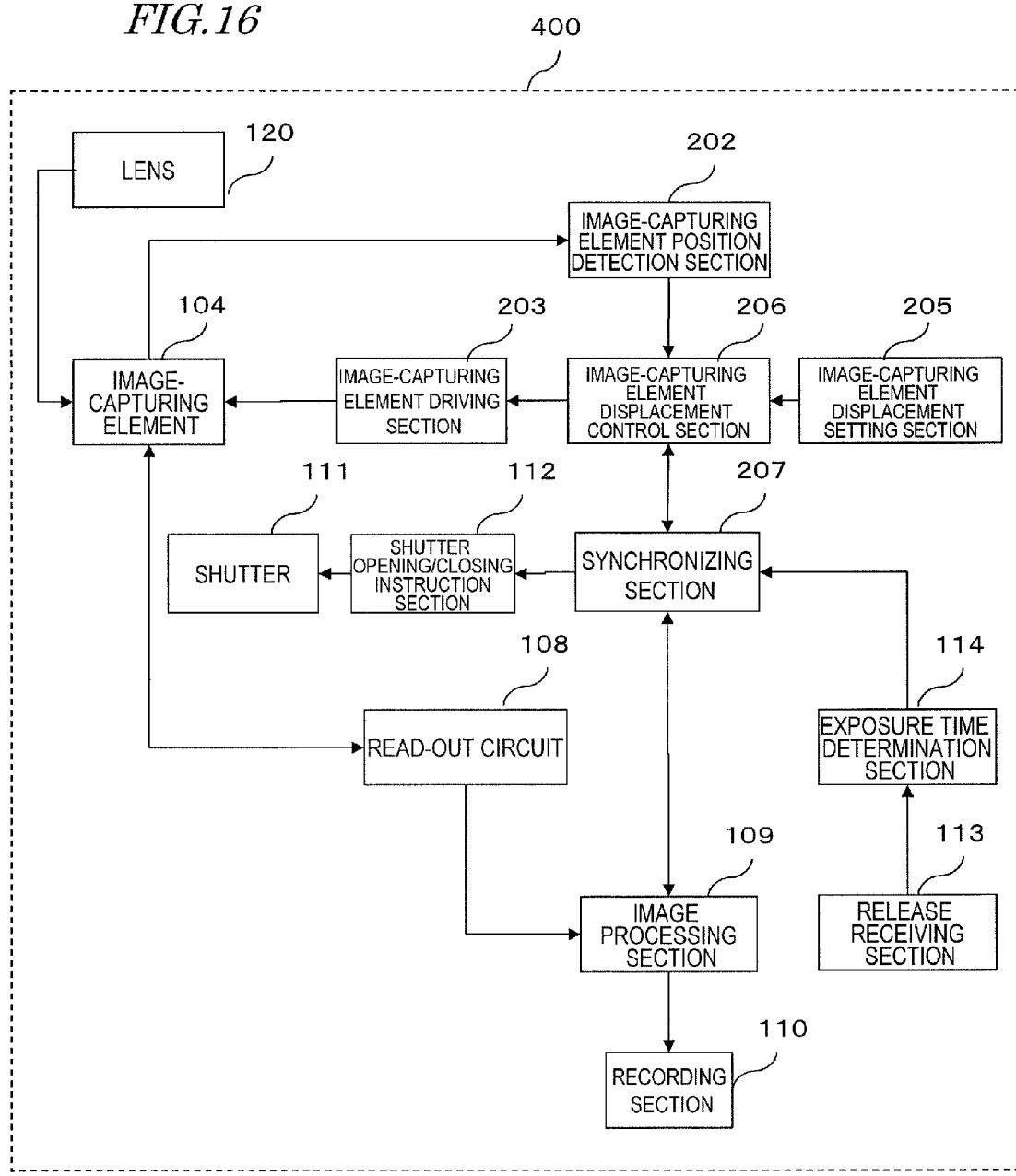
FIG. 16 A block configuration diagram of another image-capturing device examined by the present inventors.

An image-capturing device 400 shown in FIG. 16 includes the image-capturing element 104, an image-capturing element position detection section 202, an exposure/image-capturing element displacement synchronizing section 207, an image-capturing element displacement control section 206, and an image-capturing element driving section 203, where the image-capturing element is displaced during the exposure time. As opposed to the image-capturing device 300, an image-capturing element position detection section 202 detects the position of the image-capturing element 104. The exposure/image-capturing element displacement synchronizing section 207 synchronizes the exposure timing with the displacement of the image-capturing element 104. The image-capturing element displacement control section 206 controls the displacement of the image-capturing element 104. The image-capturing element driving section 203 receives a signal from the image-capturing element displacement control section 206 to drive the image-capturing element 104.

As the release receiving section 113 receives an exposure starting command from the user, the image-capturing element position detection section 202 detects the position of the image-capturing element 104 at that point in time (the initial position). After the detection, the position of the image-capturing element 104 is displaced to a predetermined end position, e.g., the nearest end or the farthest end. The nearest end in the predetermined focus range refers to the position of the image-capturing element 104 when the image-capturing element 104 has been moved so that one of the objects included in the image-capturing scene that is closest to an image-capturing device 400 forms an image on the image-capturing surface of the image-capturing element 104. Then, the distance u from the object to the focus lens 101 is shortest, and the distance v between the focus lens 101 and the image-capturing element 104 is longest. The farthest end refers to the position of the image-capturing element 104 when the image-capturing element 104 has been moved so that one of the objects included in the image-capturing scene that is farthest away from the image-capturing device 400 forms an image on the image-capturing surface of the image-capturing element 104. Then, the distance u from the object to the focus lens 101 is longest, and the distance v between the focus lens 101 and the image-capturing element 104 is shortest.

Simultaneously with the initialization of the image-capturing element 104, image-capturing parameters such as the shutter speed and the aperture are determined by the exposure time determination section 114. Immediately after the completion of these operations, an exposure/image-capturing element displacement synchronizing section 207 for synchronizing the exposure and the image-capturing element displacement outputs an exposure starting command to the image-capturing element displacement control section 206 and the shutter opening/closing instruction section 112. Simultaneously, based on the end position of the image-capturing element 104 detected by the image-capturing element position detection section 202, a command is output to the image-capturing element displacement control section 206 for displacing the image-capturing element 104 within the exposure time from the farthest end to the nearest end if the end position is the farthest end, or from the nearest end to the farthest end if the end position is the nearest end. The image-capturing element 104 is displaced at a uniform velocity.

Immediately after receiving an exposure starting command from the exposure/image-capturing element displacement synchronizing section 207, the shutter opening/closing instruction section 112 performs a control to open the shutter 111. After passage of a predetermined exposure time, the exposure/image-capturing element displacement synchronizing section 207 outputs an exposure ending command to the shutter opening/closing instruction section 112. Immediately after receiving the exposure ending command, the shutter opening/closing instruction section 112 performs a control to close the shutter 111.

When an optical image of an object forms on the image-capturing element 104 through the procedure above, the formed optical image is converted to an electrical signal by the image-capturing element 104, and an electrical signal is output to the image processing section 109 via the read-out circuit 108. Simultaneously, the exposure/image-capturing element displacement synchronizing section 207 gives a notification to the image processing section 109 that the exposure has been ended and an image-capturing operation with focus displacement by F-DOF has been performed. Otherwise, the same operation is performed as that of the image-capturing device 300 shown in FIG. 12.

In the image-capturing device 300 and the image-capturing device 400, a CCD-type image-capturing element or a CMOS-type image-capturing element is used as the image-capturing element 104. Between these types, a CMOS-type image-capturing element is better in the operation of reading out many pixels at a high speed, and it has been used in consumer devices for applications such as reading out an image of a full HD (1920×1080) size at 60 frames per second, for example.

With a CCD-type image-capturing element and a CMOS-type image-capturing element, the image-capturing element is exposed through a lens, thereby accumulating electric charge in each pixel in the image-capturing element, and image information can be obtained by reading out the electric charge. When successively reading out the electric charge obtained by exposing an image-capturing element by a CMOS-type image-capturing element, an electronic shutter controlling scheme called "rolling shutter" is used in which electric charge is read out from each pixel by successively scanning an array of pixels arranged in two dimensions by the unit of rows, or the like.

Figure 17:
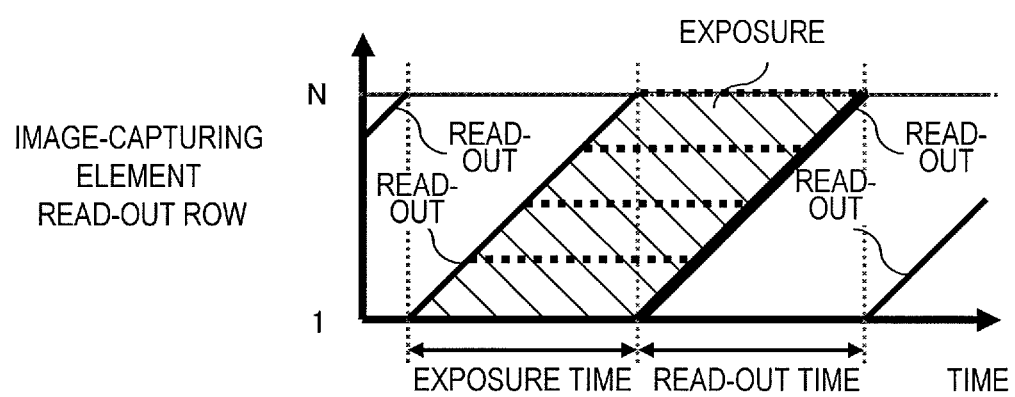
FIG. 17 A diagram illustrating a rolling shutter operation of a CMOS-type image-capturing element.

FIG. 17 shows the timing with which the electric charge is read out from an array of pixels in a CMOS-type image-capturing element. The horizontal axis represents the time, and the vertical axis represents the position of the read-out row of the image-capturing element. The image-capturing element is formed by a plurality (N) of pixel rows. As shown in FIG. 17, the process successively scans the image-capturing element starting from the top row to read out electric charge from the pixels, starts accumulating the electric charge immediately thereafter, and scans again after passage of a predetermined amount of time to read out electric charge from the pixels, thereby obtaining an image signal. It is possible to obtain a continuous moving image by repeating the scanning again from the top after completing the scanning of the $N^{th}$ row. As can be seen from FIG. 17, when an image-capturing operation is performed by the rolling shutter, there occurs a lag in the image-capturing timing across the surface of the image-capturing element, resulting in a lag of one read-out period at maximum between the top row and the final row.

In order to realize the F-DOF scheme described above, it is necessary to displace the focus state from the farthest end to the nearest end of a predetermined focus range (this operation will hereinafter be referred to as a "sweep operation") so as to obtain an image in which all pixels are uniformly exposed within the surface of the image-capturing element (this image will hereinafter be referred to as a "sweep image"). However, where a CMOS-type image-capturing element is used as the image-capturing element, there occurs a lag in the image-capturing timing across the surface of the image-capturing element due to the rolling shutter described above, and it is therefore not possible to obtain a uniform sweep image within the surface of the image-capturing element even if the sweep operation is simply performed from the farthest end to the nearest end.

FIG. 18(a) is a diagram showing the position of the focus lens (the distance between the focus lens and the image-capturing element) when the position of the focus lens is changed in a reciprocal motion between the farthest end and the nearest end, and FIG. 18(b) is a diagram showing the exposure and read-out timing of a CMOS-type image-capturing element corresponding to FIG. 18(a). The process starts accumulating electric charge in the first row of the image-capturing element starting from the position at which the image-capturing element is focused at the farthest end, and reads out the electric charge accumulated in the first row of the image-capturing element at a point in time when a position is reached such that the image-capturing element is focused at the nearest end. Simultaneously, the process starts accumulating electric charge in the final row of the image-capturing element, and reads out the electric charge accumulated in the final row of the image-capturing element at a point in time when the image-capturing element again reaches the farthest end.

FIGS. 18(c) to 18(f) are diagrams showing the distribution of the position of the focus lens and the amount of exposure for the $1^{st}$ row, which is the first row of the image-capturing element to be read out, the $i^{th}$ row and the $j^{th}$ row in the intermediate section, and the $N^{th}$ row, which is the final row.

As can be seen from the diagrams, other than the $1^{st}$ row and the $N^{th}$ row, uniform exposure from the farthest end to the nearest end is not realized, thus failing to obtain the optimal sweep image.

Note that where a CCD-type image-capturing element is used, the exposure/read-out of the image-capturing element can be done with the same timing across the surface of the image-capturing element, and it is therefore possible to obtain a sweep image through a sweep operation shown in FIG. 18(a). However, a CCD-type image-capturing element is not suitable for high-speed read-out operations. Therefore, in order to obtain an EDOF image with a high resolution and at a high frame rate, it is preferred to perform an image-capturing operation by an F-EDOF scheme in an image-capturing device using a CMOS-type image-capturing element.

In view of such a problem, the present inventors have arrived at a novel image-capturing device. Now, referring to the drawings, embodiments of an image-capturing device, an integrated circuit and an image-capturing method according to the present invention will be described in detail. In the description to follow, like elements are denoted by like reference numerals, and the description thereof may be omitted.

An image-capturing device in one aspect of the present invention includes: an image-capturing element including a plurality of photoelectric conversion elements arranged in two dimensions, wherein the plurality of photoelectric conversion elements are exposed through successive scanning and electrical signals are read out from the plurality of photoelectric conversion elements through successive scanning, thereby generating an image signal; a lens optical system including a focus lens for collecting light toward the image-capturing element; a driving section for driving one of the image-capturing element and the focus lens so as to change a distance between the image-capturing element and the focus lens; a displacement control section for outputting a command to the driving section so as to control displacement of the image-capturing element or the focus lens to be driven based on a predetermined displacement pattern; and a synchronizing section for controlling the displacement control section based on exposure timing of the image-capturing element, wherein: the predetermined displacement pattern represents a reciprocal displacement of the image-capturing element or the focus lens to be driven over an entire section between a first focus position of the focus lens or the image-capturing element at which focus is at a first object distance in an image-capturing scene and a second focus position of the focus lens or the image-capturing element at which focus is at a second object distance in the image-capturing scene; and the image-capturing element or the focus lens to be driven is reciprocally displaced an integer number of times within an exposure time for one image of the image-capturing scene for each of the plurality of photoelectric conversion elements.

In one example aspect, in the image-capturing element, the plurality of photoelectric conversion elements are arranged in two dimensions in a row direction and in a column direction; and the plurality of photoelectric conversion elements are exposed row by row, and the image signal is read out from the plurality of photoelectric conversion elements row by row.

In one example aspect, the image-capturing element or the focus lens to be driven starts the displacement operation in synchronism with a start of the exposure, and the displacement operation ends in synchronism with an end of the exposure.

In one example aspect, the image-capturing device further includes: an exposure time determination section for determining an exposure time of the image-capturing element based on the image-capturing scene; and a displacement setting section for determining the displacement pattern based on the first focus position, the second focus position and the exposure time.

In one example aspect, the image-capturing device further includes: a position detection section for detecting a position of the image-capturing element or the focus lens to be driven, wherein the displacement control section instructs the driving section of an amount of driving based on an output of the position detection section and the displacement pattern.

In one example aspect, the image-capturing device further includes: a read-out circuit for reading out the image signal from the image-capturing element, wherein the synchronizing section controls the displacement control section and the read-out circuit based on exposure timing of the image-capturing element.

In one example aspect, the number of iterations of the reciprocal displacement is 1.

In one example aspect, the number of iterations of the reciprocal displacement is 2.

An integrated circuit in one aspect of the present invention is an integrated circuit of an image-capturing device including: an image-capturing element including a plurality of photoelectric conversion elements arranged in two dimensions, wherein the plurality of photoelectric conversion elements are exposed through successive scanning and electrical signals are read out from the plurality of photoelectric conversion elements through successive scanning, thereby generating an image signal; a lens optical system including a focus lens for collecting light toward the image-capturing element; and a driving section for driving one of the image-capturing element and the focus lens so as to change a distance between the image-capturing element and the focus lens, the integrated circuit including: a displacement control section for, by outputting a command to the driving section, controlling displacement of the image-capturing element or the focus lens to be driven based on a predetermined displacement pattern; and a synchronizing section for controlling the displacement control section based on exposure timing of the image-capturing element, wherein: the predetermined displacement pattern represents a reciprocal displacement of the image-capturing element or the focus lens to be driven over an entire section between a first focus position of the focus lens or the image-capturing element at which focus is at a first object distance in an image-capturing scene and a second focus position of the focus lens or the image-capturing element at which focus is at a second object distance in the image-capturing scene; and the image-capturing element or the focus lens to be driven is reciprocally displaced an integer number of times in an exposure time for one image of the image-capturing scene for each of the plurality of photoelectric conversion elements.

An image-capturing method in one aspect of the present invention is an image-capturing method for forming an image of an image-capturing scene by collecting light by a focus lens toward an image-capturing element, the image-capturing element including a plurality of photoelectric conversion elements arranged in two dimensions, wherein the plurality of photoelectric conversion elements are exposed through successive scanning and electrical signals are read out from the plurality of photoelectric conversion elements through successive scanning, thereby generating an image signal, the image-capturing method including: in an exposure time for one image of the image-capturing scene for each of the plurality of photoelectric conversion elements, reciprocally displacing an integer number of times one of the image-capturing element and the focus lens over an entire section between a first focus position of the focus lens or the image-capturing element at which focus is at a first object distance in an image-capturing scene, and a second focus position of the focus lens or the image-capturing element at which focus is at a second object distance in the image-capturing scene.

First Embodiment

The first embodiment of an image-capturing device, an integrated circuit, and an image-capturing method according to the present invention will now be described with reference to the drawings.

Figure 1:
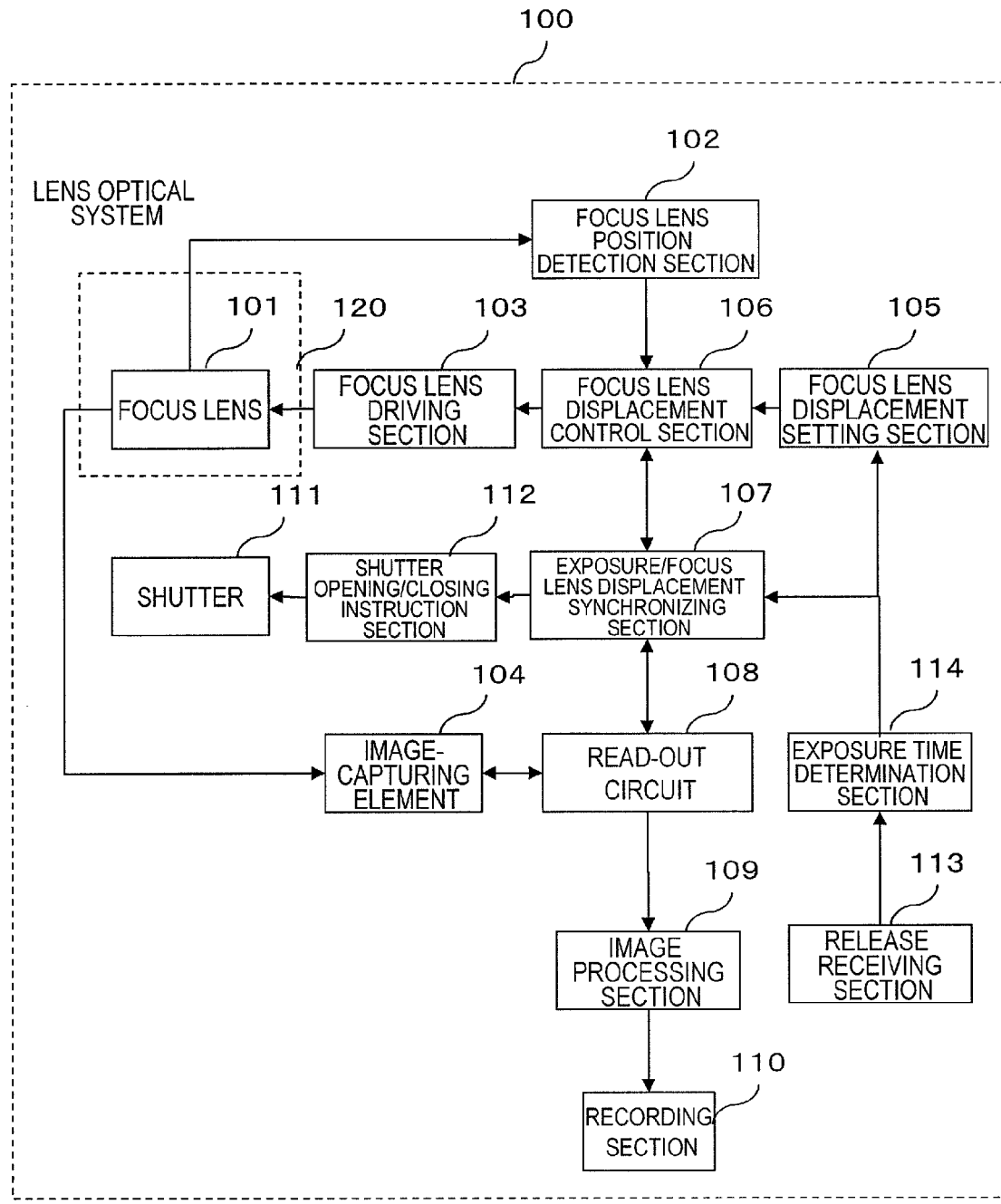
FIG. 1 A block configuration diagram of an image-capturing device according to the first embodiment.

FIG. 1 is a block configuration diagram showing an image-capturing device 100 of the present embodiment. The image-capturing device 100 includes the focus lens driving section 103, the image-capturing element 104, the focus lens displacement control section 106, the exposure/focus lens displacement synchronizing section 107, and the lens optical system 120.

The image-capturing element 104 is a COMS-type image-capturing element, and includes a plurality of photoelectric conversion elements arranged in two dimensions. The image-capturing element 104 exposes the plurality of photoelectric conversion elements through successive scanning. Electrical signals are read out from the plurality of photoelectric conversion elements through successive scanning, thereby generating an image signal.

The lens optical system 120 includes the focus lens 101 for collecting light toward the image-capturing element 104 so as to form an image of the image-capturing scene on the image-capturing element 104. The lens optical system 120 may include one or more lens other than the focus lens 101 in order to focus on an intended object in the image-capturing scene. The focus lens 101 may also include a plurality of lenses. Where the focus lens 101 includes a plurality of lenses, the position of the focus lens refers to the position of the principal point of the plurality of lenses.

In the present embodiment, a focus lens driving section 103 functions as a driving section for driving one of the image-capturing element 104 and the focus lens 101 so that the distance between the image-capturing element 104 and the focus lens 101 changes. That is, the focus lens driving section 103 drives the focus lens 101 based on a drive signal so that the distance between the image-capturing element 104 and the focus lens 101 changes.

By outputting a command to the focus lens driving section 103, the focus lens displacement control section 106 controls the displacement of the focus lens 101 based on a predetermined displacement pattern, as will be described below.

The exposure/focus lens displacement synchronizing section 107 controls the focus lens displacement control section 106 based on exposure timing of the image-capturing element 104.

The image-capturing device 100 further includes the focus lens position detection section 102, a focus lens displacement setting section 105, the read-out circuit 108, the image processing section 109, the recording section 110, the shutter 111, the shutter opening/closing instruction section 112, the release receiving section 113, and the exposure time determination section 114.

The focus lens position detection section 102 includes a position sensor, and detects the position of the focus lens 101 and outputs the detection signal to the focus lens displacement control section 106. The focus lens displacement setting section 105 sets the displacement pattern of the focus lens 101, and uses it as the target focus lens position. Therefore, the focus lens displacement control section 106 calculates a drive signal from the difference between the target focus lens position and the current position of the focus lens 101 detected by the focus lens position detection section 102, and outputs the drive signal to the focus lens driving section 103.

When the release receiving section 113 receives an exposure starting command from the user, the exposure time determination section 114 determines the exposure time of the image-capturing element 104. It also outputs information regarding the exposure time to the exposure/focus lens displacement synchronizing section 107 and the focus lens displacement setting section 105.

Based on the information regarding the exposure time, the exposure/focus lens displacement synchronizing section 107 outputs a command to the shutter opening/closing instruction section 112, the focus lens displacement control section 106 and the read-out circuit 108 so as to drive the focus lens 101 and read out electrical signals from the image-capturing element 104 with synchronized timing. Specifically, it instructs the shutter opening/closing instruction section 112 of the exposure timing and the exposure time. It also instructs the focus lens displacement control section 106 of the driving timing and the driving time for driving the focus lens 101.

The shutter 111 opens/closes in accordance with the command from the shutter opening/closing instruction section 112. When the shutter 111 is open, the image-capturing element 104 is exposed to light collected by the focus lens 101, and the light to which the image-capturing element 104 is exposed is converted to an electrical signal to be output.

The read-out circuit 108 reads out an electrical signal by outputting a read-out signal to the image-capturing element 104, and outputs the readout electrical signal to the image processing section 109.

The image processing section 109 performs various corrections, etc., on the input electrical signal, and constructs an image signal forming an image of the image-capturing scene of one video frame, one after another, and outputs the image signal to the recording section 110.

Thus, the image-capturing device 100 can obtain a sweep image by exposing the image-capturing element 104 while changing the position of the focus lens by driving the focus lens 101.

Of the components of the image-capturing device 100 described above, the focus lens position detection section 102, the focus lens driving section 103, the image-capturing element 104, the image processing section 109, the release receiving section 113 and the recording section 110 may be implemented by known hardware. Some of all of the focus lens displacement setting section 105, the focus lens displacement control section 106, the exposure/focus lens displacement synchronizing section 107, the read-out circuit 108, the image processing section 109, the recording section 110, the shutter opening/closing instruction section 112 and the exposure time determination section 114 may be implemented by an information processing circuit such as a CPU and software stored in a storage section such as a memory. In such a case, the information processing circuit reads out software defining the procedure of the image-capturing method to be described below from the memory, and executes the procedure of the image-capturing method, thereby controlling the components of the image-capturing device 100. Some of the components realized by the information processing circuit and the software stored in the memory may be implemented by dedicated integrated circuits. For example, the focus lens displacement setting section 105, the focus lens displacement control section 106, the exposure/focus lens displacement synchronizing section 107 and the shutter opening/closing instruction section 112 may be an integrated circuit.

Figure 2:
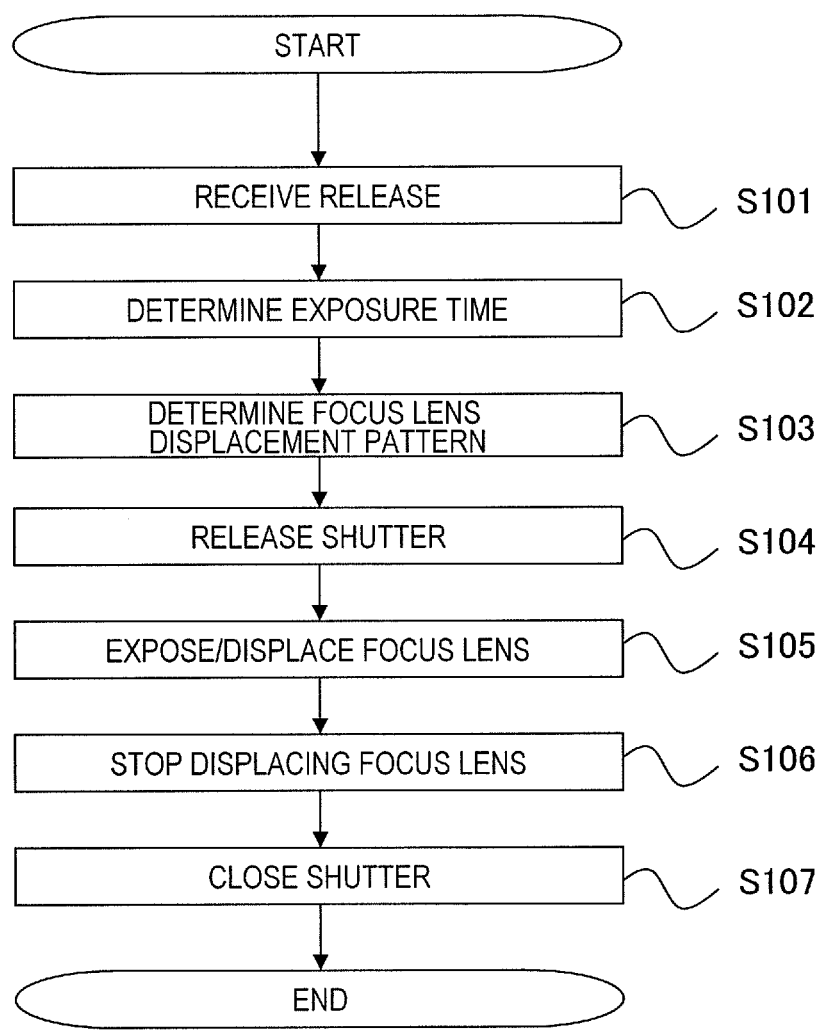
FIG. 2 A flow chart showing an operation of an image-capturing device according to the first embodiment.
Figure 3:
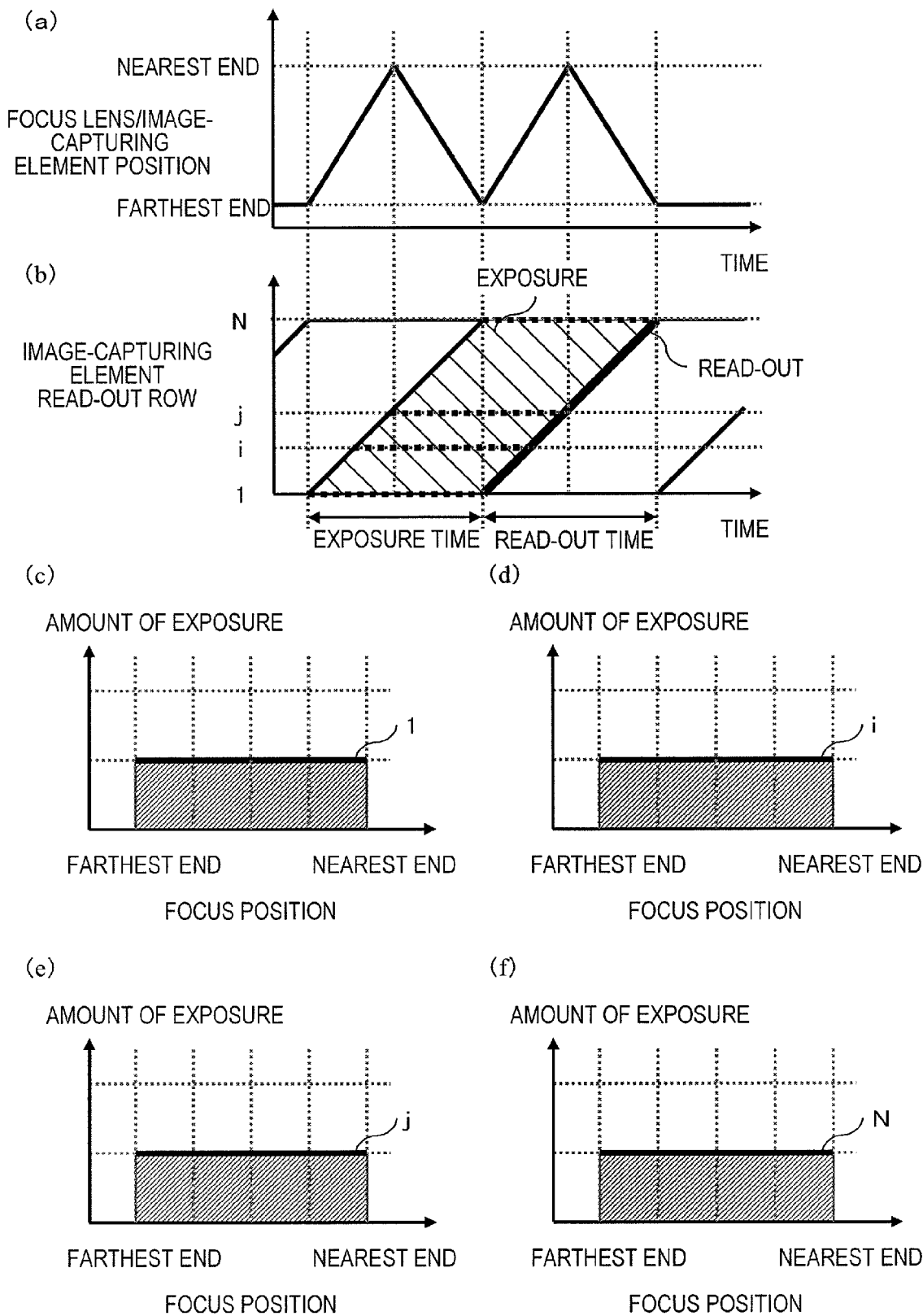
FIG. 3 (a) shows an example of a displacement pattern of a focus lens or an image-capturing element according to the first and second embodiments, and (b) shows the exposure and read-out timing of the image-capturing element; (c) to (f) each show a relationship between the amount of exposure for a predetermined row of the image-capturing element and the position of the focus lens or the image-capturing element.

Next, referring to FIGS. 1, 2 and 3, the image-capturing method of the present embodiment, particularly, the position of the focus lens for obtaining a sweep image, and the timing of the image-capturing element 104 for exposure and reading out signals.

FIG. 2 is a flow chart showing an image-capturing method of the present embodiment, and FIG. 3(a) is a diagram showing the change in the position of the focus lens when the position of the focus lens is moved in reciprocal sweep between the farthest end and the nearest end. The horizontal axis represents the time, and the vertical axis represents the position of the focus lens (the distance from the image-capturing element). FIG. 3(b) is a diagram showing the exposure and read-out timing of a CMOS-type image-capturing element corresponding to the time axis shown in FIG. 3(a). In this example, the process sets the farthest end position (where the distance between the focus lens and the image-capturing element is shortest) and the nearest end position (where the distance between the focus lens and the image-capturing element is longest) of the focus lens, where a sweep image is obtained, and then performs a reciprocal displacement operation over the entire section from the farthest end to the nearest end, wherein the position of the farthest end is used as the initial position of the focus lens.

Where in an image-capturing scene including objects present at various distances from the image-capturing device, the focus lens 101 is moved so that various objects present in a predetermined distance range are focused on the image-capturing surface of the image-capturing element 104, the farthest end and the nearest end refer to the position of the focus lens 101 when an object closest to the image-capturing device forms an image and that when an object farthest away from the image-capturing device, as described above. An object that forms an image at the farthest end (the first focus position) is located at the longest distance (the first object distance) from the image-capturing device in the predetermined distance range, and an object that forms an image at the nearest end (the second focus position) is located at the shortest distance (the second object distance) from the image-capturing device in the predetermined distance range.

Reciprocation refers to moving toward the farthest end or the nearest end starting from any point between the farthest end and the nearest end and turning around at the farthest end or the nearest end to return to the starting point. Reciprocal displacement over the entire section refers to moving toward the farthest end or the nearest end starting from any point between the farthest end and the nearest end, turning around at the farthest end or the nearest end to return to the starting point, and (if there is a section that has not been covered between the farthest end and the nearest end) further turning around to move to the nearest end or the farthest end that is present in the moving direction, and turning around again at the nearest end or the farthest end to return to the starting point.

As described above, the image-capturing element 104 is a CMOS-type image-capturing element that performs a rolling shutter operation, and the plurality of photoelectric conversion elements are arranged in two dimensions in the row direction and the column direction.

The plurality of photoelectric conversion elements are exposed row by row, and the image signal is read out from the plurality of photoelectric conversion elements row by row. In the example shown in FIG. 3, the exposure time and the read-out time are equal to each other for each row of photoelectric conversion elements of the image-capturing element 104. The amount of time for obtaining one image of the image-capturing scene, i.e., one video frame, is defined by the sum of the exposure time and the read-out time.

As shown in FIG. 2, first, upon receiving a release operation by the user (S101), the exposure time determination section 114 determines the exposure time parameter from image-capturing parameters such as the shutter speed and the aperture (S102). The exposure time parameter is output to the focus lens displacement setting section 105 and the exposure/focus lens displacement synchronizing section 107.

Then, the focus lens displacement setting section 105 generates a displacement pattern for the position of the focus lens from the determined exposure time parameter (S103). The displacement pattern represents a reciprocal displacement over the entire section between the farthest end and the nearest end. More specifically, the displacement pattern is set so that the amount of time required for one reciprocal motion across the entire section from the farthest end to the nearest end is equal to the exposure time in one video frame, and so that the reciprocal displacement operation is continued until electrical signals are read out from the entire area of the image-capturing element 104. The set displacement pattern is output to the focus lens displacement control section 106.

After determining the displacement pattern of the position of the focus lens, the exposure/focus lens displacement synchronizing section 107 outputs a command to the shutter opening/closing instruction section 112, the focus lens displacement setting section 105 and the read-out circuit 108 so that the focus lens displacement setting section 105 and the read-out circuit 108 operate based on the exposure timing of the image-capturing element 104. Thus, the shutter opening/closing instruction section 112 releases the shutter 111 to start the exposure of the image-capturing element 104, and in synchronism with the start of the exposure, the focus lens driving section 103 displaces the focus lens 101 in accordance with a command from the focus lens displacement control section 106. Synchronism as used herein includes being simultaneous and having a predetermined delay period in-between.

Specifically, as the exposure for the 1$^{st}$ row, which is the first read-out row, of the image-capturing element 104 starts, the focus lens 101 is displaced by the focus lens driving section 103 to move the position of the focus lens from the farthest end to reach the nearest end over a length of time that is ½ the exposure time. Immediately after that, a movement is started while reversing the displacement direction of the focus lens 101, and the focus lens 101 is made to arrive at the position of the farthest end upon completion of the exposure for the 1$^{st}$ read-out row. At this point, exposure has been completed only for the 1$^{st}$ read-out row, and the range from the farthest end to the nearest end needs to be exposed uniformly also for other read-out rows. Thus, the displacement operation described above is repeated and continued until the exposure and read-out operation is completed for the N$^{th}$ row, which is the final read-out row, of the image-capturing element 104. That is, the displacement operation ends in synchronism with the completion of the exposure. As described above, the read-out circuit 108 reads out electrical signals from rows of the image-capturing element 104 for which exposure is completed.

In the example shown in FIGS. 3(a) and 3(b), the position of the focus lens 101 makes just two rounds of reciprocation from the farthest end to the nearest end before the completion of the exposure and read-out operation over the entire area of the image-capturing element 104. FIGS. 3(c) to 3(f) are diagrams respectively showing the distribution of the position of the focus lens 101 and the amount of exposure for the 1$^{st}$ row, which is the first read-out row of the image-capturing element of FIG. 3(b), those for the i$^{th}$ row and the j$^{th}$ row in the intermediate section, and those for the N$^{th}$ row, which is the final row. As shown in FIGS. 3(a) and 3(b), by performing the displacement operation of the position of the focus lens 101 in synchronism with the exposure and read-out operation of the image-capturing element 104, it is possible to obtain a sweep image in which exposure has been done uniformly over the range of the position of the focus lens from the farthest end to the nearest end for all of the read-out rows of the image-capturing element 104.

After the sweep image is obtained, focus lens position displacement is stopped, and the shutter is closed, thereby completing the image-capturing operation.

In FIGS. 3(a) and 3(b), the focus lens 101 is stopped at the position of the farthest end upon completion of the read-out operation from the image-capturing element. Note however that this operation can be applied to video processing because it is possible to successively perform this operation to successively obtain sweep images.

Note that the displacement pattern of the position of the focus lens shown in FIG. 3(a) is an example, and it is possible to obtain a sweep image in which exposure has been done uniformly over the range of the position of the focus lens from the farthest end to the nearest end for all of the read-out rows by reciprocating, an integer number of times, the displacement of the position of the focus lens within the exposure time for each row of the image-capturing element 104 in one video frame. This results in repeating the reciprocal motion of the focus lens position displacement until the completion of the read-out operation for all the rows of the image-capturing element, i.e., over the entire area of the image-capturing surface. Various displacement patterns can be set as long as this condition is satisfied. In the displacement pattern of FIG. 3(a), the focus lens makes one reciprocation over the entire section defined by the farthest end and the nearest end within the exposure time, and the number of reciprocations in one video frame until the completion of the read-out operation over the entire area of the image-capturing element is 2.

Figure 4:
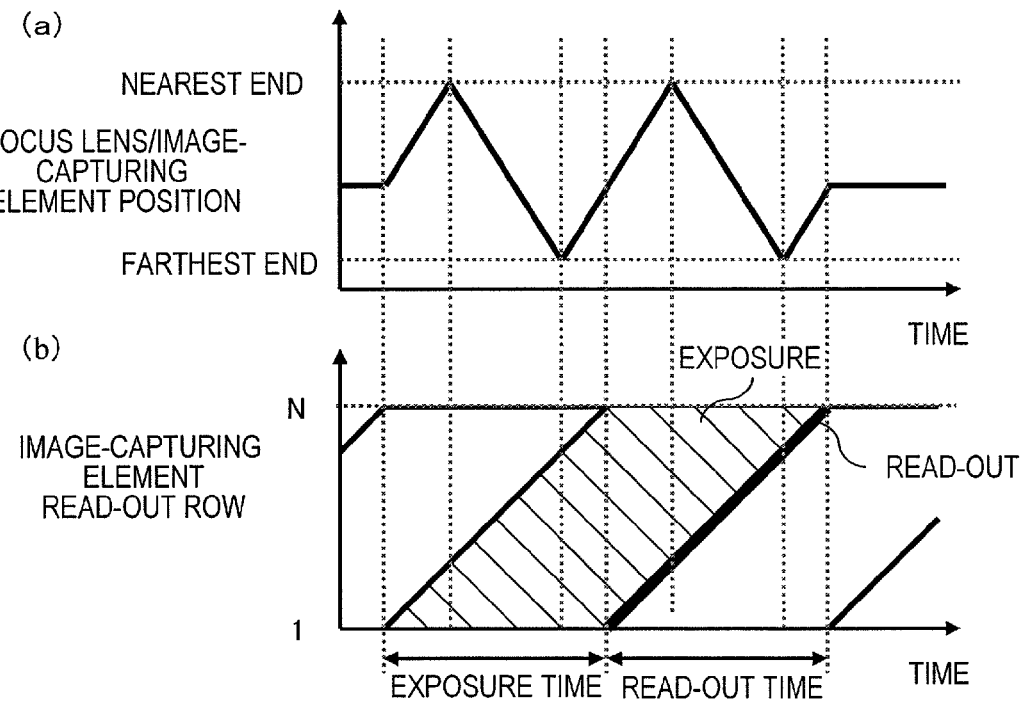
FIG. 4 (a) shows an example of a displacement pattern of a focus lens or an image-capturing element according to the first and second embodiments, and (b) shows the exposure and read-out timing of the image-capturing element.

While the initial position for the displacement of the focus lens is the farthest end in FIG. 3(a), the displacement of the focus lens may be started from any position between the farthest end and the nearest end as long as it reciprocates over the entire section defined by the farthest end and the nearest end. FIG. 4(a) shows a displacement pattern in a case where the initial position of the focus lens 101 is set to a position other than the farthest end and the nearest end. FIG. 4(b) shows the exposure and read-out timing of the image-capturing element 104 corresponding to the time axis of FIG. 4(a). As shown in FIGS. 4(a) and 4(b), even if the focus lens 101 starts to be displaced from an intermediate position between the farthest end and the nearest end in synchronism with the exposure of the image-capturing element 104, it is possible to obtain a sweep image, irrespective of the initial position of the focus lens 101, if the focus lens 101 makes one reciprocation over the entire section between the farthest end and the nearest end and returns to the position at which the movement started within the exposure time for each row of the image-capturing element 104. In the displacement pattern of FIG. 4(a), the focus lens makes one reciprocation over the entire section defined by the farthest end and the nearest end within the exposure time, and the number of reciprocations in one video frame until the completion of the read-out operation over the entire area of the image-capturing element is 2.

Figure 5:
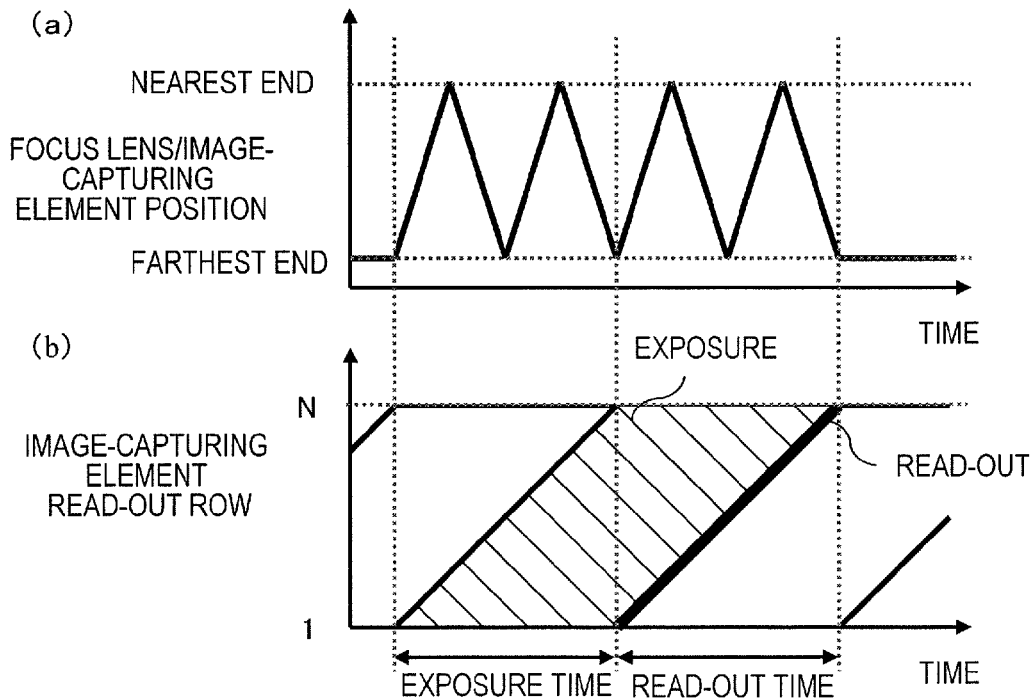
FIG. 5 (a) shows an example of a displacement pattern of a focus lens or an image-capturing element according to the first and second embodiments, and (b) shows the exposure and read-out timing of the image-capturing element.

FIG. 5(a) shows a displacement pattern in a case where the number of focus reciprocal sweeps within the exposure time for one video frame is 2. FIG. 5(b) shows the exposure and read-out timing of the image-capturing element 104 corresponding to the time axis of FIG. 5(a). As compared with the displacement pattern shown in FIG. 2(a), the displacement frequency of the position of the focus lens 101 is ½, but the number of reciprocations can be increased within the limits of the driving capacity of the focus lens driving section 103. In the displacement pattern of FIG. 5(a), the focus lens 101 makes two reciprocations over the entire section defined by the farthest end and the nearest end within the exposure time, and the number of reciprocations in one video frame until the completion of the read-out operation over the entire area of the image-capturing element is four. Even with such a displacement pattern, it is possible to obtain a sweep image in which exposure has been done uniformly over the range of the position of the focus lens from the farthest end to the nearest end for all the read-out rows of the image-capturing element 104.

While FIG. 3(a) illustrates a displacement pattern where the exposure time for each row of the image-capturing element 104 is equal to the read-out time, other displacement patterns may be employed. FIG. 6(a) shows a displacement pattern where the exposure time for each row of the image-capturing element 104 is ½ the read-out time. FIG. 6(b) shows the exposure and read-out timing of the image-capturing element 104 corresponding to the time axis of FIG. 6(a). Such an operation can be implemented by, for example, using an electronic shutter, which is a basic function of the image-capturing element 104, and it is used for the purpose of limiting the amount of exposure in cases where there is a large amount of light to be incident on the image-capturing element 104. Also in such a case, it is possible to obtain a sweep image within a range such that the focus reciprocal sweep condition is satisfied. In FIG. 6(a), the number of focus reciprocal sweeps within the exposure time for each row of the image-capturing element 104 is 1, and the number of focus reciprocal sweeps until the read-out operation for the entire area of the image-capturing surface of the image-capturing element 104 is completed is 3. Also in such a case, it is possible to obtain a sweep image in which exposure has been done uniformly over the range of the position of the focus lens from the farthest end to the nearest end for all the read-out rows of the image-capturing element 104. As described above, the initial position at which the focus lens 101 starts to be displaced may be between the farthest end and the nearest end.

FIG. 7(a) shows a displacement pattern where the exposure time for each row of the image-capturing element 104 is ⅔ the read-out time. FIG. 7(b) shows the exposure and read-out timing of the image-capturing element 104 corresponding to the time axis of FIG. 7(a). In FIG. 7(a), the number of focus reciprocal sweeps within the exposure time for each row of the image-capturing element 104 is 1, and the number of focus reciprocal sweeps from the start of the exposure until the read-out operation for the entire area of the image-capturing surface of the image-capturing element 104 is completed is 2.5. Also in such a case, it is possible to obtain a sweep image in which exposure has been done uniformly over the range of the position of the focus lens from the farthest end to the nearest end for all the read-out rows of the image-capturing element 104. Thus, by adjusting the exposure time while changing the displacement pattern in accordance with the exposure time, it is possible to arbitrarily set the position of the focus lens before and after the sweep image is obtained. This makes it possible to obtain fixed focus images and sweep images at a plurality of focus lens positions alternately and at a high speed.

Figure 8:
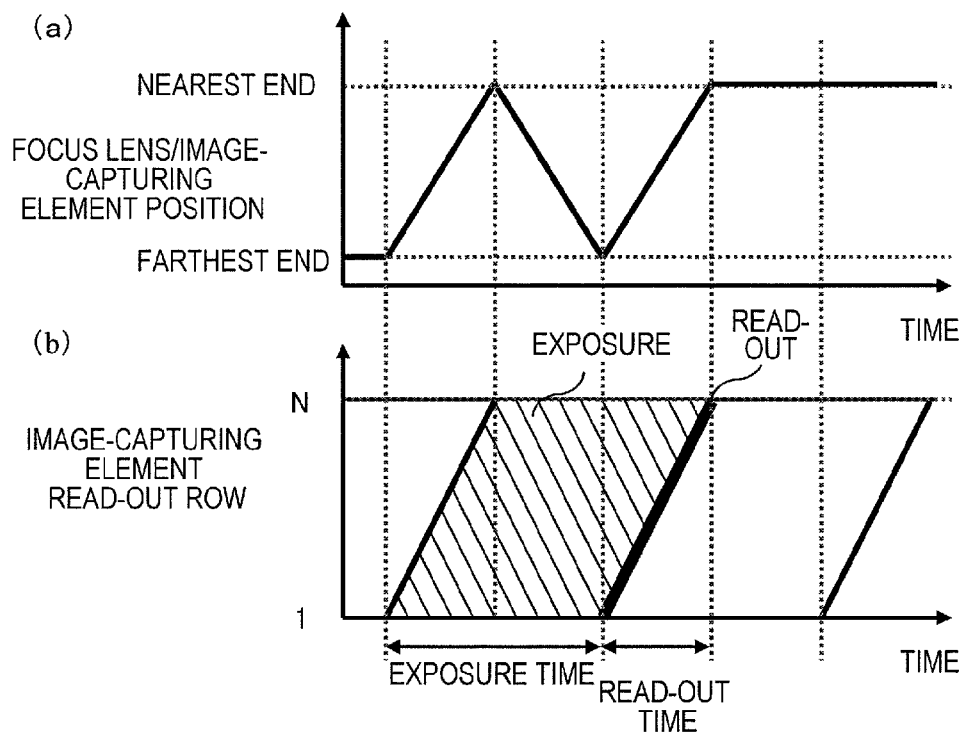
FIG. 8 (a) shows an example of a displacement pattern of a focus lens or an image-capturing element according to the first and second embodiments, and (b) shows the exposure and read-out timing of the image-capturing element.

Note that even under a condition that requires a longer exposure time, e.g., capturing an image in a dark place, the image-capturing device of the present embodiment can be used suitably. FIG. 8(a) shows a displacement pattern where the exposure time for each row of the image-capturing element 104 is twice the read-out time. FIG. 8(b) shows the exposure and read-out timing of the image-capturing element 104 corresponding to the time axis of FIG. 7(a). In the displacement pattern shown in FIG. 8(a), the number of focus reciprocal sweeps within the exposure time for each row of the image-capturing element 104 is 1, and the number of focus reciprocal sweeps from the start of the exposure until the read-out operation for the entire area of the image-capturing surface of the image-capturing element 104 is completed is 1.5.

Figure 9:
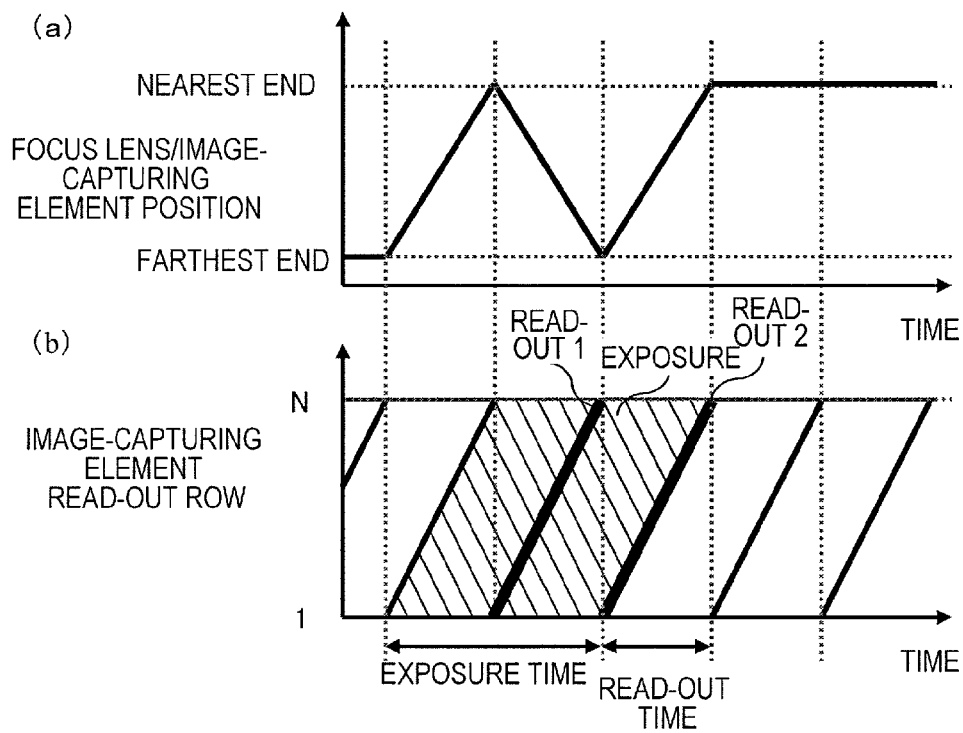
FIG. 9 (a) shows an example of a displacement pattern of a focus lens or an image-capturing element according to the first and second embodiments, and (b) shows the exposure and read-out timing of the image-capturing element.

The read-out operation may be performed twice or more within the exposure time of the image-capturing element 104. FIG. 9(a) shows a displacement pattern where the read-out operation is performed twice within the exposure time for each row of the image-capturing element 104. FIG. 9(b) shows the exposure and read-out timing of the image-capturing element 104 corresponding to the time axis of FIG. 9(a). As shown in FIG. 9(b), the read-out operation is performed twice within the exposure time for each row of the image-capturing element 104. The exposure time for each row is twice the read-out time. In the displacement pattern shown in FIG. 9(a), the number of focus reciprocal sweeps within the exposure time for each row of the image-capturing element 104 is 1, and the number of focus reciprocal sweeps from the start of the exposure until the read-out operation for the entire area of the image-capturing surface of the image-capturing element 104 is completed is 1.5. As shown in FIGS. 9(a) and 9(b), during the exposure time for Read-out 1 or Read-out 2, the focus lens does not span the entire area from the farthest end to the nearest end, except for the $1^{st}$ row and the $N^{th}$ row of the image-capturing element 104. The electrical signal from either Read-out 1 or Read-out 2 is not a sweep image in which exposure has been done uniformly over the range of the position of the focus lens from the farthest end to the nearest end. However, by using, as an image signal for one video frame, an image signal obtained by synthesizing together the electrical signals of Read-out 1 and Read-out 2 by means of the image processing section 109, there is obtained a sweep image in which exposure has been done uniformly over the range of the position of the focus lens from the farthest end to the nearest end.

While FIGS. 9(a) and 9(b) show a displacement pattern where the read-out operation is performed twice within the exposure time for each row, the exposure time may be increased and the read-out operation may be performed three times or more. The exposure time does not need to be an integer multiple of the read-out time. In the displacement pattern shown in FIG. 9(a), assuming that the read-out time is about the same as the read-out time in the displacement pattern shown in FIG. 3(a), for example, the operating frequency of the focus reciprocal sweep operation can be lowered as compared with that with the displacement pattern shown in FIG. 3(a). Decreasing the operating frequency leads to reduction in the power consumption of the focus lens driving section or easing of the specifications thereof, and is advantageous for products, such as digital still cameras, where there is a demand for reducing the size, the power consumption and the cost.

Note that the displacement of the focus lens during the reciprocal sweep operation described above may be a generally uniform linear motion for both ways so that the amount of exposure is uniform at every focus lens position in the sweep image.

The operation of the image-capturing device using the displacement pattern described above in the present embodiment is not dependent on the read-out time (speed) of the image-capturing element. By expanding/shrinking the displacement patterns shown in FIGS. 3(a) to 9(a) in the time axis direction in accordance with the exposure time and the read-out time, there is obtained a sweep image in which exposure has been done uniformly over the range of the position of the focus lens from the farthest end to the nearest end as described above.

Decreasing the read-out time decreases the exposure time and also decreases the one video frame period. In this case, the speed of displacement of the focus lens may be increased accordingly. Alternatively, as described above with reference to FIG. 9, image signals from a plurality of iterations of the exposure and read-out operation may be synthesized together to obtain an image signal for one video frame, in which case the speed of displacement of the focus lens does not need to be increased. This makes it possible to reduce the power consumption of the focus lens driving section.

Note that for the operation described above with referenced to FIGS. 5 to 9, the initial position of the focus lens may be any position between the farthest end and the nearest end, as in the case described above with reference to FIG. 4.

If the reciprocation distance over which the focus reciprocal sweep operation is performed (the distance between the farthest end and the nearest end) is large, it may require the focus lens driving section to have a higher level of driving performance, and it may lead to an increase in the power consumption. In such a case, the section defined by the farthest end and the nearest end may be divided into a plurality of sub-sections, and a sweep image may be obtained for each sub-section, thus allowing a sweep image to be obtained over a wider focal length. For example, the section defined by the farthest end and the nearest end may be divided in two at a middle position, and a focus reciprocal sweep operation described above with reference to FIGS. 3 to 9 may be performed repeatedly and alternately for the sub-section from the middle position to the farthest end and for the sub-section from the middle position to the nearest end. This makes it possible to reduce by half the reciprocal amplitude for each iteration. By further dividing the sub-section into smaller sections, it is possible to obtain a sweep image over a very wide area through a series of operations. These operations are more advantageous when combined with an image-capturing element capable of high-speed read-out operations.

As described above, according to the present embodiment, by performing an exposure and read-out operation for the image-capturing element while displacing the position of the focus lens, it is possible to obtain sweep images continuously at a high speed even with a CMOS-type image-capturing element for performing a rolling shutter operation.

Second Embodiment

Figure 10:
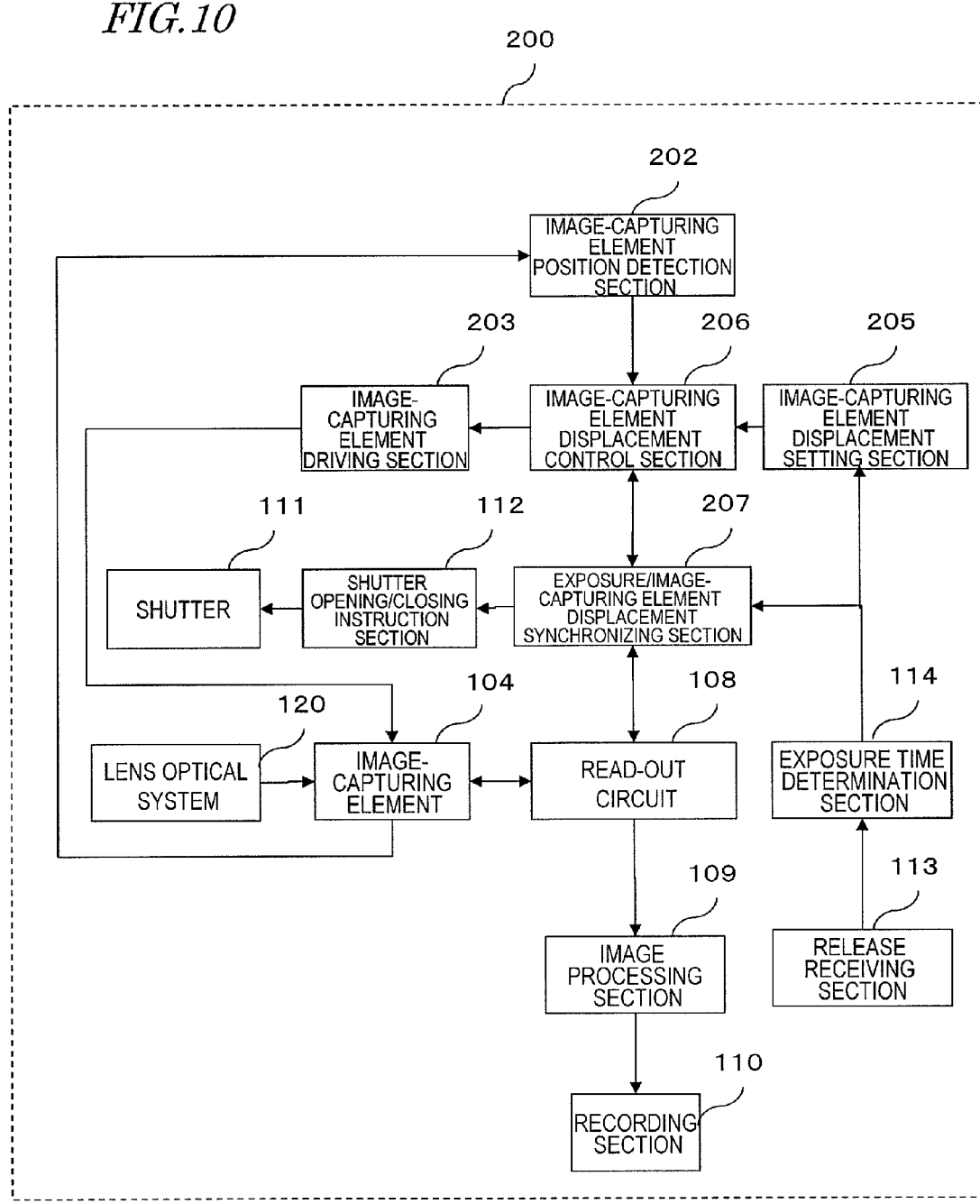
FIG. 10 A block configuration diagram of an image-capturing device according to the second embodiment.
Figure 11:
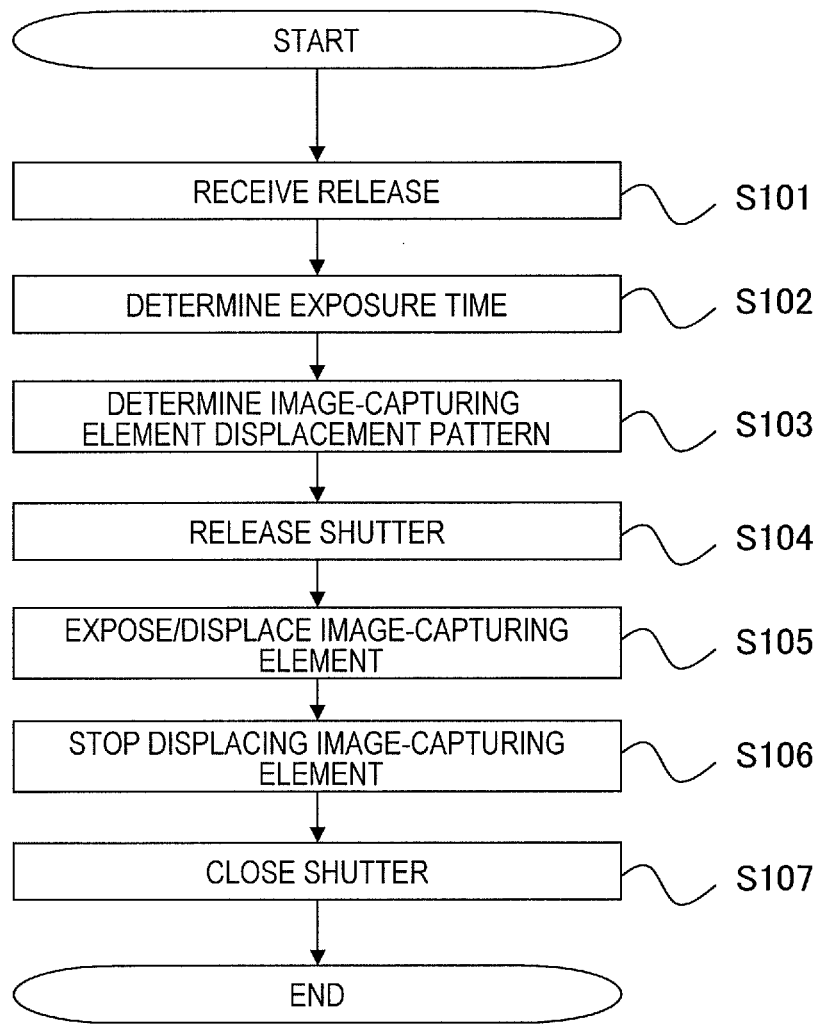
FIG. 11 A flow chart showing an operation of an image-capturing device according to the second embodiment.

Referring to FIGS. 10 and 11, the second embodiment of an image-capturing device, an integrated circuit and an image-capturing method according to the present invention will be described.

FIG. 10 is a block configuration diagram showing an image-capturing device 200 of the present embodiment. Like elements to those of the image-capturing device 100 of the first embodiment are denoted by like reference numerals. The image-capturing device 200 is different from the image-capturing device 100 in that the distance from the lens optical system 120 to the focus lens 101 is changed by moving the position of the image-capturing element 104.

For this, an image-capturing device 200 includes the image-capturing element position detection section 202, the image-capturing element driving section 203, an image-capturing element displacement setting section 205, the image-capturing element displacement control section 206, and the exposure/image-capturing element displacement synchronizing section 207.

The image-capturing element position detection section 202 includes a position sensor to detect the position of the image-capturing element 104, and outputs the detection signal to the image-capturing element displacement control section 206. The image-capturing element displacement setting section 205 sets a displacement pattern of the image-capturing element 104, and uses it as the target image-capturing element position. Thus, the image-capturing element displacement control section 206 calculates a drive signal from the difference between the target image-capturing element position and the current position of the image-capturing element 104 detected by the image-capturing element position detection section 202, and outputs the drive signal to the image-capturing element driving section 203.

In the release receiving section 113, when an exposure starting command from the user is received, the exposure time determination section 114 determines the exposure time of the image-capturing element 104. It also outputs information regarding the exposure time to the exposure/image-capturing element displacement synchronizing section 207.

Based on the information regarding the exposure time, the exposure/image-capturing element displacement synchronizing section 207 outputs a command to the shutter opening/closing instruction section 112, the image-capturing element displacement control section 206 and the read-out circuit 108 so as to expose, drive the image-capturing element 104 and read out electrical signals from the image-capturing element 104 with synchronized timing. Specifically, it instructs the shutter opening/closing instruction section 112 of the exposure timing and the exposure time. It also instructs the image-capturing element displacement control section 206 of the driving timing and the driving time for driving the image-capturing element 104. Thus, the image-capturing device 200 can obtain a sweep image by exposing the image-capturing element 104 while driving the image-capturing element 104 to change the position of the image-capturing element.

FIG. 11 is a flow chart showing an image-capturing method of the present embodiment. This is the same as the image-capturing method of the first embodiment described with reference to FIG. 2 except for the image-capturing element is displaced in order to change the distance between image-capturing element and the focus lens.

The displacement pattern of the image-capturing element is the same as that of FIGS. 3(a) to 9(a), which is the displacement pattern of the position of the focus lens described above in the first embodiment.

Thus, it is possible to obtain a sweep image as in the first embodiment also with a configuration for driving the image-capturing element to change the position of the image-capturing element.

In the first and second embodiments described above, a stepping motor may be used in the focus lens driving section 103 or the image-capturing element driving section 203. In such a case, since it is possible to identify the current position of the focus lens 101 or the image-capturing element 104 without using the focus lens position detection section 102 or the image-capturing element position detection section 202, the image-capturing device does not need to have the focus lens position detection section 102 or the image-capturing element position detection section 202. Alternatively, a voice coil motor may be used as the focus lens driving section 103 or the image-capturing element driving section 203. In such a case, it is possible to drive at a higher speed than with a stepping motor. Moreover, a piezoelectric element actuator may be used as the focus lens driving section 103 or the image-capturing element driving section 203. In such a case, it is possible to drive with a lower power consumption than with a voice coil motor.

The specific implementations and examples of the embodiments described above are merely to illustrate the technical details of the present invention, and the present invention shall not be taken to be limited to such specific examples. The embodiments described above may be carried out with various changes and modifications made thereto.

INDUSTRIAL APPLICABILITY

With the image-capturing device, the integrated circuit and the image-capturing method disclosed in the present application, it is possible to capture a video or a series of still images in an F-DOF scheme using a CMOS-type image-capturing element that performs a rolling shutter operation. These configurations can suitably be used for commercial or industrial digital still cameras, digital video cameras, and the like, for example.

REFERENCE SIGNS LIST

100, 200, 300, 400 Image-capturing device
101 Focus lens
102 Focus lens position detection section
103 Focus lens driving section
104 Image-capturing element
105 Focus lens displacement setting section
106 Focus lens displacement control section
107 Exposure/focus lens displacement synchronizing section
108 Read-out circuit
109 Image processing section
110 Recording section
111 Shutter
112 Shutter opening/closing instruction section
113 Release receiving section
114 Exposure time determination section
120 Lens optical system
202 Image-capturing element position detection section
203 Image-capturing element driving section
205 Image-capturing element displacement setting section
206 Image-capturing element displacement control section
207 Exposure/image-capturing element displacement synchronizing section

The invention claimed is:

1. An image-capturing device comprising:
a CMOS-type an image-capturing element including a plurality of photoelectric conversion elements arranged in two dimensions in a row direction and in a column direction, wherein the plurality of photoelectric conversion elements are exposed through successive scanning and electrical signals are read out from the plurality of photoelectric conversion elements row by row through successive scanning, thereby generating an image signal;
a lens optical system including a focus lens for collecting light toward the image-capturing element;
a driving section for driving one of the image-capturing element and the focus lens so as to change a distance between the image-capturing element and the focus lens;
a displacement control section for outputting a command to the driving section so as to control displacement of the image-capturing element or the focus lens to be driven based on a predetermined displacement pattern; and
a synchronizing section for controlling the displacement control section based on exposure timing of the image-capturing element, wherein:
the predetermined displacement pattern represents a reciprocal displacement of the image-capturing element or the focus lens to be driven over an entire section between a first focus position of the focus lens or the image-capturing element at which focus is at a first object distance in an image-capturing scene and a second focus position of the focus lens or the image-capturing element at which focus is at a second object distance in the image-capturing scene; and
the image-capturing element or the focus lens to be driven is reciprocally displaced an integer number of times within an exposure time of each row of the plurality of photoelectric conversion elements.

2. The image-capturing device of claim 1, wherein the image-capturing element or the focus lens to be driven starts the displacement operation in synchronism with a start of the exposure, and the displacement operation ends in synchronism with an end of the exposure.

3. The image-capturing device of claim 1, further comprising:
an exposure time determination section for determining an exposure time of the image-capturing element based on the image-capturing scene; and
a displacement setting section for determining the displacement pattern based on the first focus position, the second focus position and the exposure time.

4. The image-capturing device of claim 3, further comprising
a position detection section for detecting a position of the image-capturing element or the focus lens to be driven, wherein the displacement control section instructs the driving section of an amount of driving based on an output of the position detection section and the displacement pattern.

5. The image-capturing device of claim 4, further comprising
a read-out circuit for reading out the image signal from the image-capturing element,
wherein the synchronizing section controls the displacement control section and the read-out circuit based on exposure timing of the image-capturing element.

6. The image-capturing device of claim 1, wherein the number of iterations of the reciprocal displacement is 1.

7. The image-capturing device of claim 1, wherein the number of iterations of the reciprocal displacement is 2.

8. An integrated circuit of an image-capturing device comprising: a CMOS-type image-capturing element including a plurality of photoelectric conversion elements arranged in two dimensions in a row direction and in a column direction, wherein the plurality of photoelectric conversion elements are exposed row by row through successive scanning and electrical signals are read out from the plurality of photoelectric conversion elements through successive scanning, thereby generating an image signal; a lens optical system including a focus lens for collecting light toward the image-capturing element; and a driving section for driving one of the image-capturing element and the focus lens so as to change a distance between the image-capturing element and the focus lens, the integrated circuit comprising:

a displacement control section for, by outputting a command to the driving section, controlling displacement of the image-capturing element or the focus lens to be driven based on a predetermined displacement pattern; and a synchronizing section for controlling the displacement control section based on exposure timing of the image-capturing element, wherein:

the predetermined displacement pattern represents a reciprocal displacement of the image-capturing element or the focus lens to be driven over an entire section between a first focus position of the focus lens or the image-capturing element at which focus is at a first object distance in an image-capturing scene and a second focus position of the focus lens or the image-capturing element at which focus is at a second object distance in the image-capturing scene; and the image-capturing element or the focus lens to be driven is reciprocally displaced an integer number of times in an exposure time off each row of the plurality of photoelectric conversion elements.

9. An image-capturing method for forming an image of an image-capturing scene by collecting light by a focus lens toward a CMOS-type image-capturing element, the image-capturing element including a plurality of photoelectric conversion elements arranged in two dimensions in a row direction and in a column direction, wherein the plurality of photoelectric conversion elements are exposed through successive scanning and electrical signals are read out from the plurality of photoelectric conversion elements through successive scanning, thereby generating an image signal, the image-capturing method comprising:

in an exposure time of each row of the plurality of photoelectric conversion elements, reciprocally displacing an integer number of times one of the image-capturing element and the focus lens over an entire section between a first focus position of the focus lens or the image-capturing element at which focus is at a first object distance in an image-capturing scene, and a second focus position of the focus lens or the image-capturing element at which focus is at a second object distance in the image-capturing scene.

\* \* \* \* \*